United States Patent
Ehling (12)

(10) Patent No.: US 6,351,117 B1
(45) Date of Patent: Feb. 26, 2002

(54) METHOD AND APPARATUS FOR GENERATING TRANSDUCER OUTPUT PULSES COMPENSATED FOR COMPONENT VARIATIONS

(75) Inventor: Ernst Ehling, Neuhausen (DE)

(73) Assignee: Balluff, Inc., Florence, KY (US)

( * ) Notice: Subject to any disclaimer, the term of this patent is extended or adjusted under 35 U.S.C. 154(b) by 0 days.

(21) Appl. No.: 09/399,644

(22) Filed: Sep. 20, 1999

(51) Int. Cl.$^7$ .............................. G01B 7/14; G01F 23/30

(52) U.S. Cl. ........................... 324/207.13; 324/207.12; 324/207.24; 702/104

(58) Field of Search ........................ 324/207.13, 207.22, 324/207.24, 207.12, 225, 235; 73/313, 314; 702/85, 94, 97, 104

(56) References Cited

U.S. PATENT DOCUMENTS

| | | |
|---|---|---|
| 4,028,619 A | 6/1977 | Edwards |
| 4,161,880 A | 7/1979 | Prosky |
| 4,253,155 A | 2/1981 | Freiday et al. |
| 4,319,189 A | 3/1982 | Cullum, Jr. et al. |
| 4,510,587 A | 4/1985 | Schneider |
| 4,698,996 A | 10/1987 | Kreft et al. |
| 4,709,210 A | 11/1987 | Pond |
| 4,726,226 A | 2/1988 | Tellerman |
| 4,839,590 A | 6/1989 | Koski et al. |
| 4,873,655 A | 10/1989 | Kondraske |
| 4,912,397 A | 3/1990 | Gale et al. |
| 4,912,409 A | 3/1990 | Redlich et al. |
| 4,943,773 A | 7/1990 | Koski et al. |
| 4,952,873 A | 8/1990 | Tellerman |
| 4,958,332 A | 9/1990 | Tellerman |

(List continued on next page.)

OTHER PUBLICATIONS

MTS Systems Corporation, *Temponics® L Series*, (12 pgs.), 1998.

Data Instruments, Printout from Data Instruments website, www.datainstruments,com. page "line__rot/model–hydrastar.html" (4 pgs.). Apr. 28, 1999.

Primary Examiner—Walter E. Snow
(74) Attorney, Agent, or Firm—Dinsmore & Shohl LLP

(57) ABSTRACT

A measurement transducer and method is provided which provides a pair of pulses as an output, the measured condition being represented by the time between the pulses, and which includes internal compensation such that the pair of pulses are adjusted to mimic the output of a predetermined ideal transducer. In one embodiment, correction factors are calculated for a magnetostrictive linear position transducer by comparing the transducer output with a position measurement taken by a separate measuring device. These correction factors are stored in a non-volatile memory. Then, during operation of the transducer, a correction factor is selected for each uncorrected measurement and added to the uncorrected measurement to provide a compensated measurement. The compensated measurement is then used to generate a time value using a calculation which includes a predetermined standard waveguide propagation velocity value. The output pulses are then generated based upon this time value, such that the pulses represent a measurement as it would appear if output from an perfectly linear waveguide having the predetermined standard waveguide propagation velocity. Accordingly, the output pulses are linearized and standardized to the predetermined propagation velocity. Thus, the control system (or other electronic circuit) which receives the output pulses need not be re-programed with the propagation velocity of the actual waveguide used in the transducer when the transducer is replaced or otherwise modified. Rather, the control system (or other electronic circuit) can be programmed permanently with the predetermined standard waveguide propagation velocity, and then used with any transducer having such a standardized output.

31 Claims, 10 Drawing Sheets

U.S. PATENT DOCUMENTS

| | | |
|---|---|---|
| 5,017,867 A | 5/1991 | Dumais et al. |
| 5,038,305 A | 8/1991 | Kumar et al. |
| 5,043,685 A | 8/1991 | Nyce |
| 5,070,485 A | 12/1991 | Nyce |
| 5,076,100 A | 12/1991 | Hunter et al. |
| 5,115,195 A | 5/1992 | Peterson et al. |
| 5,136,884 A | 8/1992 | Lovett |
| 5,189,911 A | 3/1993 | Ray et al. |
| 5,196,791 A | 3/1993 | Dumais |
| 5,206,586 A | 4/1993 | Yauch et al. |
| 5,258,707 A | 11/1993 | Begin et al. |
| 5,274,328 A | 12/1993 | Begin et al. |
| 5,313,160 A | 5/1994 | Gloden et al. |
| 5,320,325 A | 6/1994 | Young et al. |
| 5,334,933 A | 8/1994 | Tellerman |
| 5,406,200 A | 4/1995 | Begin et al. |
| 5,412,316 A | 5/1995 | Dumais et al. |
| 5,421,193 A | 6/1995 | Carlin et al. |
| 5,473,245 A | 12/1995 | Silvus, Jr. et al. |
| 5,502,999 A | 4/1996 | Seberger et al. |
| 5,514,961 A | 5/1996 | Stoll et al. |
| 5,535,625 A | 7/1996 | Levy |
| 5,545,984 A | 8/1996 | Gloden et al. |
| 5,583,433 A | 12/1996 | Sawa |
| 5,590,091 A | 12/1996 | Gloden et al. |
| 5,680,041 A | 10/1997 | Begin |
| 5,714,881 A | 2/1998 | Begin |
| 5,717,330 A | 2/1998 | Moreau et al. |
| 5,726,567 A | 3/1998 | Lewis et al. |
| 5,729,131 A | 3/1998 | Begin |
| 5,736,855 A | 4/1998 | Smith et al. |
| 5,804,696 A | 9/1998 | Seberger et al. |
| 5,804,961 A | 9/1998 | Castillo et al. |
| 5,821,743 A | 10/1998 | Page, Jr. et al. |
| 5,903,426 A | 5/1999 | Ehling |
| 5,923,164 A | 7/1999 | Ehling et al. |

( CALIBRATION )

(OPERATION)

250 252

| CALCULATED POSITION FROM MEASURED TIME ( USING ACTUAL GRADIENT AND ASSUMING LINEARITY ) ( D = v * t ) | ACTUAL POSITION (FROM LASER MEASUREMENT) |
|---|---|
| 0.2 | 0 |
| 1 | 0.8 |
| 2 | 1.9 |
| 3 | 3 |
| 4 | 3.7 |
| 5 | 4.8 |
| 6 | 5.9 |
| 7 | 6.8 |
| 8 | 7.7 |
| 9 | 9.8 |
| 10 | 10.1 |

250 254

| CALCULATED POSITION FROM MEASURED TIME ( USING ACTUAL GRADIENT AND ASSUMING LINEARITY ) ( D = v * t ) | CORRECTION FACTOR NEEDED TO OBTAIN ACTUAL POSITION ( FROM LASER MEASUREMENT ) |
|---|---|
| 0.2 | -0.2 |
| 1 | -0.2 |
| 2 | -0.1 |
| 3 | 0 |
| 4 | -0.3 |
| 5 | -0.2 |
| 6 | -0.1 |
| 7 | -0.2 |
| 8 | -0.3 |
| 9 | -0.2 |
| 10 | +0.1 |

(CALIBRATION)

(OPERATION)

METHOD AND APPARATUS FOR GENERATING TRANSDUCER OUTPUT PULSES COMPENSATED FOR COMPONENT VARIATIONS

TECHNICAL FIELD

The present invention relates generally to transducers, such as magnetostrictive position transducers for example, and, more specifically, to transducers which provide a pulsed output such that the time between pulses is proportional to the condition being measured and is compensated to account for various factors. In particular, in one embodiment, the present invention relates to a method and apparatus for generating magnetostrictive position transducer output pulses which are standardized for waveguide propagation speed (i.e., "gradient"), and which are also compensated to account for waveguide non-linearities.

BACKGROUND OF THE INVENTION

A transducer may provide any of a variety of output signals. For example, an analog voltage (or current) output signal may be provided wherein the output voltage (or current) is directly proportional to the condition being measured. Alternatively, the transducer may provide a digital output, such as a synchronous serial interface (SSI) for example, in which the condition being measured is provided as a data word. The type of output which is provided by the transducer depends upon the particular environment in which the transducer will be used, and the controller or apparatus to which the output will be provided.

Another example of a transducer output is the start/stop output, or pulse interface, in which the time between a first and second pulse is directly proportional to the condition or quantity being measured. By way of example, in a magnetostrictive position transducer, a controller provides an interrogation pulse which results in an elastic deformation of a waveguide in the transducer originating at a magnetic marker on the transducer. The deformation propagates along the waveguide in both directions, in the form of a mechanical wave having longitudinal and torsional components. The mechanical wave is then converted to a response pulse by a suitable convertor, such as a coil, tape or crystal. The interrogation pulse and response pulse are provided as a start/stop pulse output, and the time between the two pulses represents the position of the magnet, which is connected to the movable mass being measured. The present invention is applicable to such pulsed output or pulse interface transducers, wherein the time between two pulses represents a condition or feature (e.g., a position) being measured.

The accuracy of transducers can be affected by imperfections and variances in the components and materials which make up the transducer. For example, the magnetostrictive waveguide of a position transducer can have variances in material and size across its length, which produce an undesirable non-linear output over the length of the waveguide. In other words, the transducer may not produce a perfectly linear output with respect to position along the waveguide, due to manufacturing variances along the waveguide. While careful screening of materials and components can reduce inaccuracies due to non-linearity, such screening and control can take time, can add to the expense of manufacturing the transducer, and can result in numerous waveguides which must be discarded.

Moreover, two transducers of the same type may produce differing outputs due to material variances or irregularities. As an example, due to slight differences in materials or structural variations, a magnetostrictive waveguide of one transducer may have a different propagation speed than that of another transducer. (The propagation speed or "gradient" of a waveguide is the speed at which a mechanical wave will travel along the waveguide.) Accordingly, such variances need to be taken into account in order for the output of the transducer to be accurately interpreted by the apparatus which receives the output of the transducer. For example, if a controller in a machine receives the pulsed output of a magnetostrictive position transducer, it conventionally needs to be programmed with the propagation speed of the transducer's waveguide in order to accurately interpret the output of the transducer. Such programming requires the user to be experienced with the programming procedure, requires time on the part of the user in conducting the programming, and can be error-prone. Moreover, if the transducer must be replaced, the controller must be re-programmed to account for the particular characteristics of the replacement transducer. Also, such programming typically does not account for non-linearity.

Accordingly, it is desirable to allow for correction of imperfections and variances in a transducer, such as variances due to material composition and tolerances, without requiring input on the part of the user, without requiring programming for each particular transducer, and without requiring tedious and wasteful selection of materials or components. It is particularly desirable to provide such correction in the context of transducers which utilize magnetostrictive waveguides, where non-linearities and gradient variances can be problematic. Such compensation is particularly desired in applications where high accuracy is demanded.

In certain transducers, it has been known to provide some automatic compensation capabilities internally to the transducer, such that user input is not required. However, such compensation has heretofore not been provided in transducers which utilize a pulsed output. In particular, there has not been available a method or apparatus to accurately generate compensated output pulses from a transducer. For example, in the context of a magnetostrictive linear position transducer with a digital pulse interface, heretofore, no capability has been provided to change or re-create the pulsed output of the transducer.

Accordingly, there remains a need for a method and apparatus for changing or re-creating the output of a pulsed interface transducer so as to compensate for variances within a particular transducer (e.g., non-linearities) and/or variances between transducers (e.g., propagation speed differences), so as to eliminate calibration input from the user, and to avoid the need for careful screening and/or discarding of materials. Moreover, there remains a need for such a method and apparatus which can provide a highly accurate output with high resolution.

SUMMARY OF THE INVENTION

It is an object of the present invention to obviate the above-described problems.

It is a further object of the invention to provide a pulsed output transducer which does not require the user to calibrate the control system with which the transducer will be used.

It is yet another object of the invention to provide a method and apparatus to automatically compensate for non-linearities in a pulsed output transducer where the time between the output pulses represents the condition or feature being measured.

Yet another object of the invention is to provide a method and apparatus to automatically compensate for propagation speed variations in a pulsed output transducer.

Another object of the present invention is to provide a pulsed output transducer having compensated start and stop pulses with high output resolution, the time between the pulses representing the condition or feature being measured.

It is another object of the invention to provide a magnetostrictive linear position transducer having start/stop output pulses, which does not require the user to calibrate the control system with which the transducer will be used.

Another object of the invention to provide a magnetostrictive linear position transducer having start/stop output pulses which are compensated to account for variances due to non-linearities and/or propagation speed.

Yet another object of the invention is to provide a method and apparatus to generate automatically compensated start/stop output pulses from a magnetostrictive position transducer, the time between the pulses representing linear position with high accuracy.

It is another object of the invention is to provide a method and apparatus to generate start/stop output pulses from a magnetostrictive position transducer such that the time between the pulses represents predicted linear position and is automatically compensated for variances in the transducer.

Another object of the invention is to provide a linear position transducer which can be provided within a cylinder, while taking up less space and being more protected from damage.

To achieve the foregoing and other objectives, a method for providing a compensated linear position transducer output is provided. The method comprises generating an interrogation signal to create a mechanical wave in a waveguide, converting the mechanical wave to a response signal, measuring the time between the interrogation signal and the response signal, and calculating a position based upon the measured time. The method also comprises adjusting the calculated position such that it matches an ideal transducer having a linear waveguide response and a predetermined standard waveguide propagation velocity. In addition, the method comprises generating a start pulse and a stop pulse, the time between the pulses being derived from the adjusted position.

Also provided is a method for providing a compensated transducer output. The method comprises providing a digital value representing a detected condition, and adjusting the digital value to imitate the response of a predetermined ideal transducer. The method also comprises generating a first transducer output pulse, and generating a second transducer output pulse after the first pulse. The time delay between the first and second pulses is derived from the adjusted digital value.

A linear position transducer system is also provided comprising a waveguide, an interrogation pulse generator circuit, and a mode convertor in communication with the waveguide. The system also includes a calculation circuit in communication with the mode convertor and the interrogation pulse generator circuit. The calculation circuit is configured to measure the time between the generation of the interrogation signal from the interrogation pulse generator and the generation of a response signal from the mode convertor, and is also configured to generate a digital value based upon the time measurement. The system also includes a compensation circuit in communication with the calculation circuit. The compensation circuit is configured to adjust the digital value to create a compensated digital value which simulates the response of a waveguide having a predetermined standard propagation velocity. Also include in the system is a stop pulse generator circuit in communication with the compensation circuit and configured to generate a stop pulse based upon the compensated digital value.

In addition, a linear position transducer system is also provided comprising a cylinder, and a waveguide provided at least partially within the cylinder. The system also includes an interrogation pulse generator circuit, a mode convertor in communication with the waveguide, and a proximal electronics housing located adjacent the cylinder. Also included in the system is signal conditioning circuitry provided at least partially within the proximal electronics housing and in communication with the mode convertor. The signal conditioning circuitry is configured to convert an analog response pulse from the mode convertor to a digital pulse signal. Also included are remote electronics located remotely from the cylinder, comprising a calculation circuit in communication with the signal conditioning circuitry. The calculation circuit is configured to measure the time between the generation of an interrogation signal from the interrogation pulse generator and the generation of a digital pulse signal from the signal conditioning circuitry, and to generate a digital value based upon the measured time.

Still other objects of the present invention will become apparent to those skilled in this art from the following description wherein there is shown and described preferred embodiments of this invention, including a best mode currently contemplated for carrying out the invention, simply for the purposes of illustration. As will be realized, the invention is capable of other different aspects and embodiments without departing from the scope of the invention. Accordingly, the drawings and descriptions are illustrative in nature and not restrictive in nature.

BRIEF DESCRIPTION OF THE DRAWINGS

While the specification concludes with claims particularly pointing out and distinctly claiming the invention, it is believed that the same will be better understood from the following description taken in conjunction with the accompanying drawings in which:

DETAILED DESCRIPTION OF THE PREFERRED EMBODIMENTS

Figure 1:
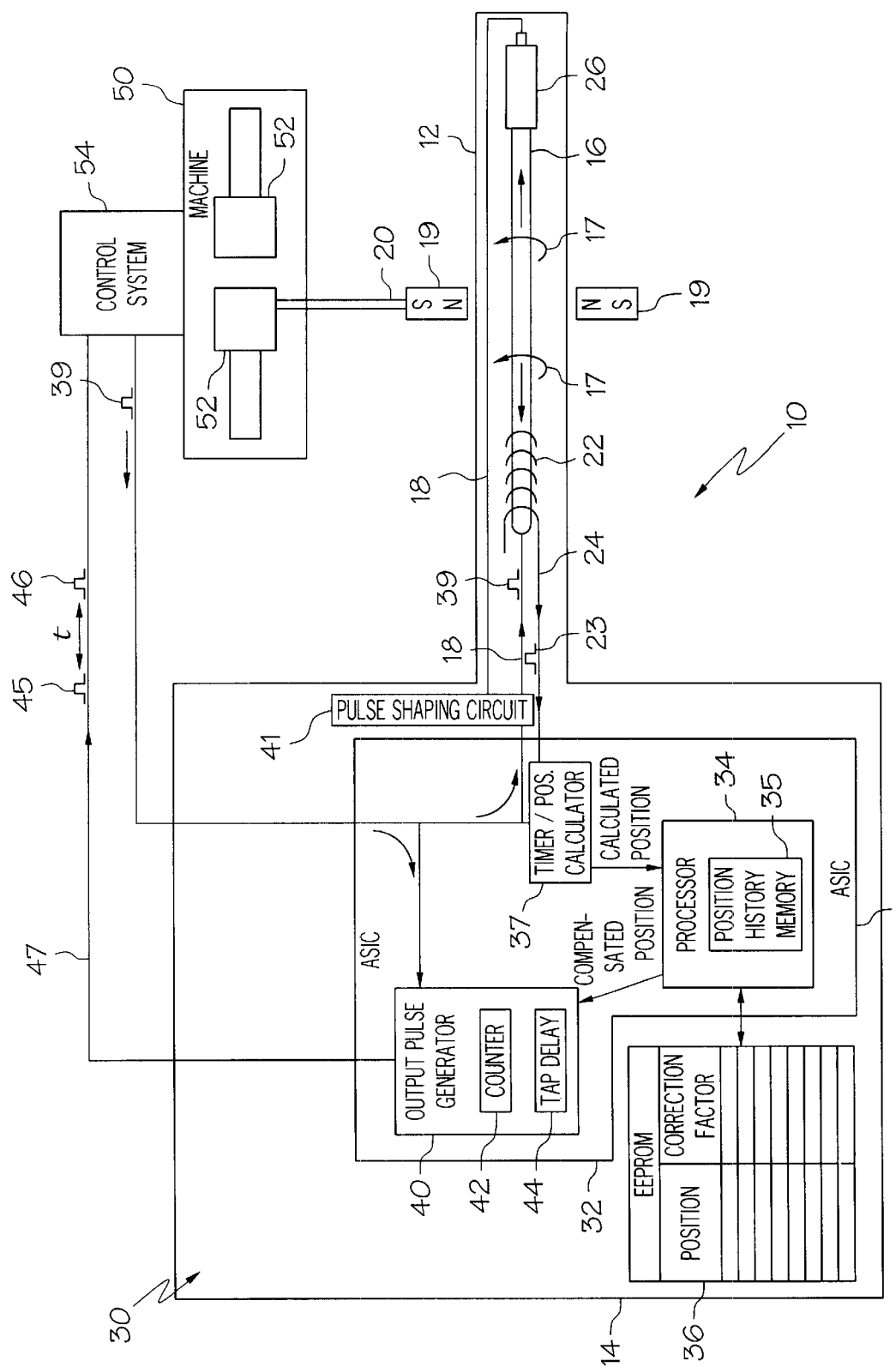
FIG. 1 is a diagram illustrating a side view of an exemplary internally compensated, pulsed-output magnetostrictive transducer made in accordance with principles of the present invention.

Turning now to the drawings in detail, wherein like numbers illustrate corresponding structure, FIG. 1 illustrates an exemplary internally compensated, pulsed-output transducer, made in accordance with the principles of the present invention. It should be noted that while reference is made herein to magnetostrictive linear position transducers, such reference is made only for the purposes of illustration. It is contemplated that the principles of the invention could apply to other types of pulsed output transducers, sensors, or detectors, such as LVDT's (linear variable differential transducers) for example.

FIG. 1 shows an exemplary linear position transducer 10, which includes a waveguide housing 12 and an electronics housing 14. While such linear position transducers can take any of a variety of forms and structural combinations known in the industry, exemplary structures will be discussed for purposes of general illustration and understanding of the present invention. Exemplary structures are disclosed in U.S. Pat. Nos. 5,903,426, and 5,923,164, the entire disclosures of which are hereby incorporated herein by reference.

The shape of the housing 12 in FIG. 1 can depend upon the application of the transducer 10. For example, a rod-style or cylindrical housing could be utilized for insertion into hydraulic cylinders, and a generally rectangular-shaped housing might be utilized for applications having moving components external to cylinders. The housings 12 and 14 are preferably made of an extruded aluminum or stainless steel, although other rigid, protective materials could be utilized.

Provided within the waveguide housing 12 is a magnetostrictive waveguide 16, which is preferably in the form of an elongated wire, rod, or bar, and most preferably is tubular in shape. The waveguide 16 is generally made from a magnetic material which has the ability to deform, expand, or contract in proportion to the strength of an applied magnetic field, and is therefore considered "magnetostrictive." Examples of such materials include nickel and nickel-alloy. Preferably, the waveguide 16 is hollow and includes an opening which extends longitudinally through its center.

A conductor 18 runs from electronics 30 in the electronics housing 14, and through the length of the opening within the tubular waveguide 16. The conductor 18 then runs back to the electronics 30 on the exterior of the waveguide 16. Alternatively, the waveguide 16 could comprise a solid wire or rod of conductive material. In such a case, two conductors 18 could be provided to connect the two ends of the solid waveguide 16 to appropriate electronics 30.

At one end of the waveguide 16 is a pickup coil 22 which has a portion which effectively surrounds an end portion of the waveguide. Other suitable signal convertors could be utilized as alternatives to the coil 22, such as a magnetic tape or a piezoelectric crystal for example.

Surrounding or connected to the opposite end of the waveguide 16 is a damper 26, which is preferably made of a silicone, rubber or other material which can absorb mechanical waves to minimize interference from wave reflections. In some applications, the use of such a damper 26 would not be necessary.

Slidingly engaged with the exterior of the waveguide housing 12 is a magnet 19. The magnet 19 can have a round shape with a center opening (e.g., a donut-like shape) for engaging the housing 12. The magnet 19 could take on other shapes and configurations as well. For example, the magnet 19 could have a flat, rectangular shape to slidingly engage one side of the housing 12, such as through the engagement of a groove or track on the housing 12. As another alternative, the magnet 19 could comprise an existing movable part of a machine, such as a magnetic piston head within a cylinder of a machine, or could comprise a plurality of magnets spaced around the waveguide.

In the exemplary embodiment of FIG. 1, the magnet 19 is mechanically connected, via control arm 20, to a movable member 52 within a machine 50. For example, the movable member 52 could comprises a movable face on a hydraulic press, or a movable spindle on a spindle press. Because of the linkage 20 between the movable member 52 and the magnet 19, movement of the member 52 results in corresponding movement of the magnet 19. Other applications are contemplated as well, such as, for example, placing the housing 12 in a vertical position, and providing a float on the magnet 19 to allow it to follow the movement of a fluid in a container. A control system 54 is provided to receive output pulses 45 and 46 from the transducer 10, and to control operation of the machine 50 based, at least in part, on these pulses. The time between the pulses 45 and 46 is proportional to the position of the movable member 52.

The electronics 30 within the electronics housing 14 control the operation of the transducer 10. The electronics 30 and housing 14 can be located in proximity to the waveguide housing 12, or in a remote location, as required by the application. Also, a separate housing need not be provided for the electronics 30.

In operation, the control system 54 provides an interrogation pulse signal 39 of electrical current to the electronics 30 and through the conductor 18. (Alternatively, the electronics 30 can include a pulse generator to provide the interrogation pulse signal 39 through the conductor 18, in which case, the control system 54 need not provide the interrogation pulse signal 39.)

This pulse 39 generates a circular electromagnetic field which rotates around the waveguide 16. When the electromagnetic field intersects with the magnetic field of the magnet 19, a magnetostrictive effect is created, causing deformation of the waveguide 16. The deformation travels or propagates along the waveguide 16 in both directions from the point of the magnet 19 in the form of a mechanical wave 17. The propagation velocity, or gradient, of the mechanical wave 17 along the waveguide 16 is usually about 2830 meters per second (m/s) for waveguide materials typically used in such transducers. Preferably, the pulse 39 is fed from the control system 54 and through a pulse shaping circuit 41 prior to being fed through the conductor 18. The pulse shaping circuit 41 provides any necessary shaping of the pulse 39, such as amplification for example, to ensure that the pulse 39 is of the proper amplitude and duration to produce a detectable magnetostrictive effect in the waveguide 16.

The component of the wave 17 which reaches the distal end of the waveguide 16 is preferably damped by the damping material 26, to prevent it from reflecting and possibly interfering with future measurements. On the proximal end of the waveguide 16, the mechanical wave 17 passes by the coil 22, where it is converted to an electrical signal. This conversion results in an electrical signal 23 being produced at the terminals of the coil 22. (If a piezo-electric crystal were used instead of the coil 22, torsional movement of the waveguide 16 would impart a strain to the crystal which would produce a corresponding voltage pulse from the crystal.)

As known in the art, the travel time of the wave 17 from the magnet 19 to the coil 22 is directly proportional to the distance of the magnet from the coil. In particular, the following equation relates the position of the magnet 19:

$$D = v*t,$$

where D is the distance between the coil 22 and the magnet 19, t is the time it takes for the wave 17 to travel from the magnet 19 to the coil 22, and v is the propagation velocity of the waveguide 16.

Accordingly, knowing the propagation velocity v and the time t, the distance of the magnetic marker 19 can be determined. Subsequently, the position of the movable mass 52 is known. Because the initiation of the wave 17 at the magnet 19 is nearly instantaneous with initiation of the current pulse 39, and because the reception of the wave 17 at the coil 22 is nearly instantaneous with the generation of the return pulse 23, the time t can be closely approximated by measuring the time between the generation of the current pulse 39 and the receipt of the return pulse 23, as known in the art. Thus, if the propagation velocity v and time t are known, the distance D can be calculated. As an example, if the time t were measured to be 100.1234 microseconds and the propagation speed of the waveguide 16 was known to be 2830 meters per second, the distance of the magnet 19 would be about 0.283349222 meters.

According to prior art pulsed output transducers, the response pulse 23 was fed directly to the user's control system 54, which controls the machine 50 (or process equipment). This control system 54 would require and measure the time between the interrogation pulse 39 and the response pulse 23, and then perform the calculation using the equation described above.

However, as can be understood, the calculation of the position based upon the equation above is made using several assumptions. First, the propagation velocity v used to make the calculation is assumed to be the actual velocity of the waveguide 16. Moreover, as illustrated by the equation used, the relationship between distance D and time t is assumed to be linear across the length of the waveguide.

However, in practice, these conditions are rarely, if ever, met. First, the actual propagation speed of the waveguide 16 usually differs from the typical (or standard) value. Second, the waveguide speed usually is not perfectly linear. Accordingly, unless adjustments are made to the calculated position by the control system 54, the actual position of the magnet 19 will differ somewhat from the calculated position.

Thus, to achieve accurate measurement calculations, heretofore, the user would need to adjust the velocity v used in the equation within the control system 54, so as to match that of the waveguide 16 actually used. (Typically, the average propagation velocity of a waveguide 16 was measured by the manufacturer of the transducer 10 and included with the transducer specification.)

Accordingly, if the user replaced the transducer 10 with a new unit, he or she would need to re-program the control system 54 to account for the new properties of the unit. This process was time-consuming, error-prone, and required knowledge on the part of the user. Moreover, adjustment for linearity was not included in these control systems 54, and, subsequently, some errors between the control system's calculated position and the magnet's actual position remained. To obtain better linearity, careful selection of waveguides, and/or tight control of their manufacture, was required, sometimes at greater expense.

However, according to principles of the present invention, and as described in further detail below, electronics 30 provide an "artificial" pulsed output via start pulse 46 and stop pulse 45, and do not provide the pulse 23 as output. Like prior art pulsed interface transducers, the location of the magnet 19 is still represented by a pair of pulses, the time between the pulses varying in proportion to the distance of the magnet from a predetermined start location. However, in contrast to pulse interface transducers of the prior art, the transducer 10 adjusts its "artificial" output pulses (45 and 46) to accommodate for the particular propagation speed of the waveguide 16, according to principles of the present invention. Moreover, according to another aspect of the present invention, the transducer 10 adjusts these output pulses (45 and 46) to account for non-linearities of the waveguide 16. The data to allow for these compensations is recorded when the transducer 10 is manufactured. Accordingly, the user need not make any adjustments to his or her control system 54. Moreover, the time and expense of choosing finer materials for constructing the transducer 10 is saved.

According to one aspect of the present invention, a standard propagation speed can be assumed by the user, and the control system 54 need only be programmed once to make the position calculation using this speed, regardless of whether a new transducer 10 is connected to the machine. The user can simply install the new transducer 10 and begin operation immediately, in a "plug and play" fashion. The knowledge and time needed to make changes to the control system 54 are thereby not required by a user, as the control system can be permanently set to the standard propagation speed. According to principles of the present invention, the transducer 10 internally makes adjustments to the position measurement (to standardize the propagation speed and linearize the output), and then artificially produces pulses to represent the adjusted measurement.

Specific examples of how these aspects and advantages can be accomplished will now be described in more detail, with respect to exemplary embodiments. In the embodiment of FIG. 1, and according to principles and aspects of the present invention, the transducer 10 makes a plurality of distance calculations internally, uses these calculations to predict the next position of the magnet 19, and then adjusts the predicted digital calculation according to data recorded during calibration of the transducer 10. The adjusted digital value is then used to "artificially" generate a pair of output pulses 45 and 46, the time between the pulses being in proportion to the adjusted digital value. Accordingly, the control system 54 still receives the pulsed output that it requires, but the needed adjustments are made internally to the transducer 10, requiring no changes to or programming of the control system by the user.

More specifically, in the embodiment of FIG. 1, the time between the interrogation pulse 39 and the response pulse 23 is measured by a timer/position calculator circuit 37. Preferably, the circuit 37 is provided as part of an application specific integrated circuit (ASIC) 32, according to principles known in the art. However, it is contemplated that a separate component could be also be provided, as an alternative. For example, the circuit 37 could comprise a programmable interval timer (or counter) integrated circuit to conduct the time measurement, and a multiplier integrated circuit to conduct the position calculation. It is also contemplated that other controllers and processors could be utilized to conduct the operations of these circuits.

The timer and position calculator circuit 37 is in communication with (i.e., provides signals to and/or receives signals from, such as through electrical connection for example) the coil 22 and the pulse generator in the control system 54. The timer/position calculator 37 measures the time between the generation of the interrogation pulse 39 from control system 54 and the generation of the response pulse 23 at the coil 22. It is preferred that this timing operation occurs with very high resolution, such as 61 picosecond resolution for example. Then, from this measured time, the circuit 37 calculates the magnet position D, such as by using the equation described above. Preferably, the control system 54 provides an interrogation pulse 39 once every 1 millisecond.

The electronics 30 also includes a microprocessor 34 which is in communication with the timer/position-calculation circuit 37 and a non-volatile memory 36. Preferably, the microprocessor 34 and nonvolatile memory 36 are integrated in the ASIC 32, although separate components could be provided as known in the art. The microprocessor 34 could comprise any of a variety of digital processors, controllers, or processing circuitry. Preferably, the microprocessor 34 receives the pulse 39 so that it is informed when a new measurement is being taken. Then, when it receives a calculated position from the circuit 37, the microprocessor 34 stores the calculated position in a position history memory 35, which can be an integral component of the microprocessor. Alternatively, the memory 35 could comprise a separate memory unit. This history of stored positions in memory 35 is then used by the microprocessor 34 to predict the current position of the magnet 19, such as by using a mathematical extrapolation from the previous two stored positions, or by using any suitable curve fitting technique, if it is desirable to predict the position based on more than two stored positions.

Figure 2:
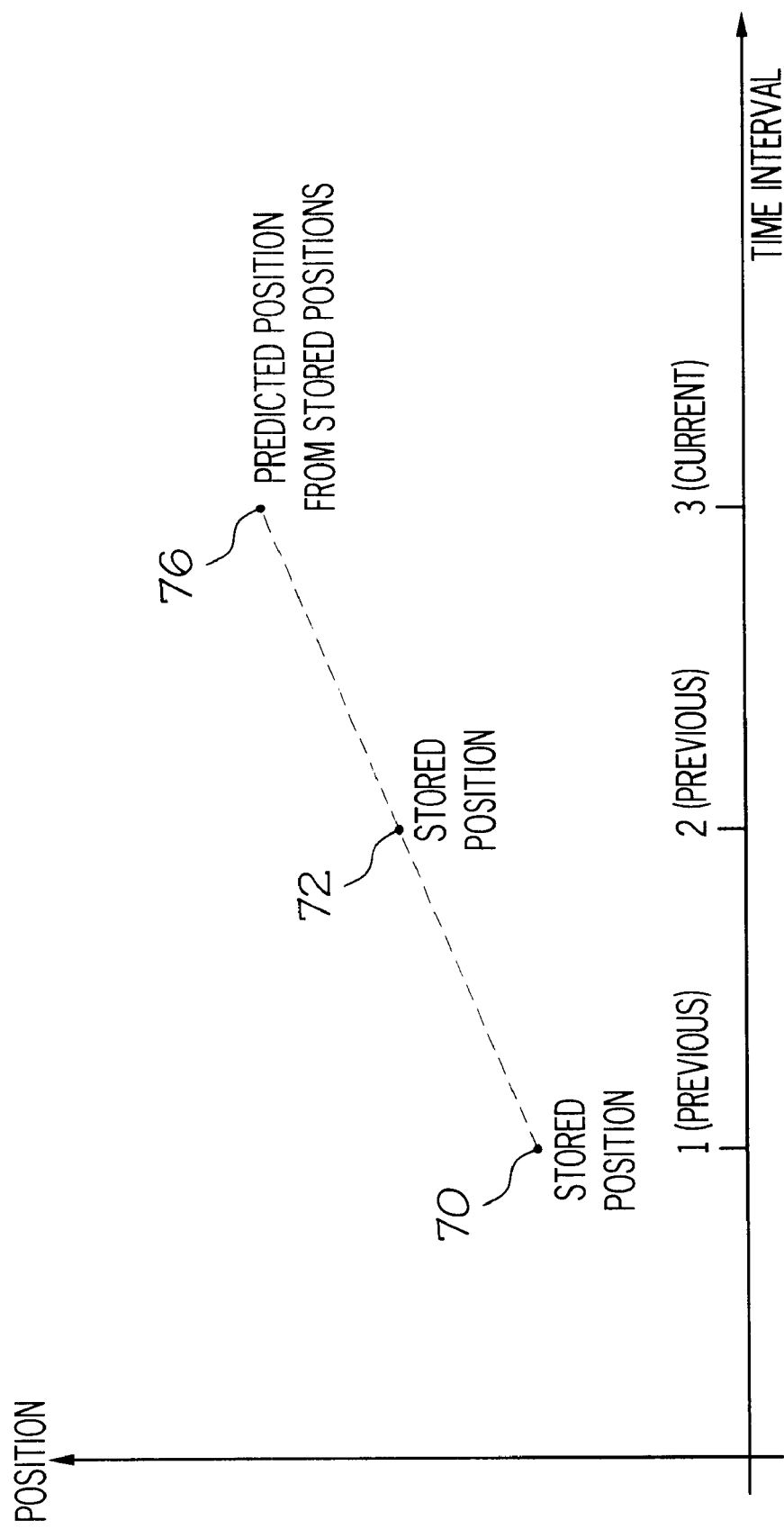
FIG. 2 is a graph illustrating an extrapolation technique which can be used in the transducer of FIG. 1 for predicting a position.

An example of the stored data in memory 35 is shown in FIG. 2. For each of the previous two interrogation pulse intervals, the circuit 37 calculates a position, and the microprocessor 34 stores these positions in memory 35. Examples of these two previous positions are shown at data points 70 and 72 of FIG. 2. From this historical data, the microprocessor 34 can then predict or anticipate the position of the magnet 19 at the start of the current interrogation pulse, such as by using an extrapolation or curve fitting technique. In the example of FIG. 2, the position 76 at the start of the current interrogation pulse would be predicted by the microprocessor 34 using a linear extrapolation algorithm.

After calculating this predicted position value, the microprocessor 34 then adjusts or compensates it for variances, using a correction factor stored in memory 36, and in accordance with principles of the present invention. As an example, memory 36 could comprise an Electrically Erasable Programmable Read Only Memory (EEPROM). Within the memory 36 are stored a plurality of positions and, for each of these positions, a correction factor which accounts for the particular properties (e.g., propagation velocity, non-linearity) of the transducer components. This data can be stored in a look-up table (LUT) fashion. The data in the memory 36 can be created according to principles of the present invention during calibration of the transducer 10, as described in further detail below.

Using the predicted position, the processor 34 accesses or "looks up" a correction factor corresponding to that position. For example, the processor could look up a correction factor directly from the memory 36. Alternatively, the processor could download the data from the memory 36 into an internal memory at power-up, and then select correction factors from this internal memory. The processor 34 then adds (or otherwise applies) the selected correction factor to the predicted position to generate a compensated position.

The microprocessor (or controller) 34 is also in communication with an output pulse generator 40, which is preferably part of ASIC 32. The output pulse generator 40 receives the compensated predicted position (a digital value) from the processor 34, and generates two pulses (45 and 46), the time between the pulses being proportional to the magnitude of that digital value.

The first output pulse ("start" pulse) 46 is generated whenever an interrogation pulse 39 is provided by the control system 54. Then, the output pulse generation circuit 40 uses any appropriate timing or counting mechanism, such as counter circuit 42 in combination with a tap delay circuit 44, to generate the stop output pulse 45.

First, the compensated position value is converted to a time value by the output pulse generator 40, using the linear equation described above, and the predetermined standard propagation velocity. Alternatively, the conversion of the compensated position value to a time value could occur in the processor 34, or a separate processor. The counter circuit 42 of the pulse generator is then used to count this time value with "coarse" resolution. However, the counting intervals (resolution) of the counter circuit 42 are relatively large, such that a finer resolution counter or delay circuit is preferred. For example, the counter circuit 42 could comprises a 2 Mhz digital clock, which generates coarse time (to within 500 nanoseconds).

In the embodiment of FIG. 1, to obtain finer resolution (and, thus, a better correlation between the counting and the compensated position value), a tap delay circuit 44 is included in the ASIC 32 to clock or count the remaining portion of the time value which corresponds to the compensated position fed from the microprocessor 34. For example, a 61 picosecond tap delay could be utilized. In this way, the main portion of the digital time value is counted using the counter 42, and the remainder is counted using the tap delay 44. For example, the integer part of the adjusted position value could be counted using the counter 42, and the fractional part counted using the tap delay circuit 44. While standard oscillators, clocks, timers, or counters could be utilized as alternatives to the combination of the counter 42 and the tap delay 44 of FIG. 1, the use of such components typically may not achieve the resolution that is provided by the coarse counting of the counter 42 in combination with the fine counting of the tap delay 44. In the preferred embodiment, the output pulse generator 40 of the ASIC 32 provides a resolution of about 122 picoseconds or less, meaning that the time t between the pulses 45 and 46 can be incremented or decremented by 122 picoseconds intervals, allowing for the compensated position from the processor 34 to be represented in intervals of about 0.35 micrometers (for a gradient of 2830 meters per second). It is also preferred that a resolution of 1767 picoseconds or less is provided (for a gradient of 2830 meters per second), to meet applications which require measurements of at least 5 micrometer resolution. While the combination of the counter 42 and the tap delay circuit 44 provides one way of achieving such high resolution, it should be understood that any appropriate counting or timing mechanism which can achieve the desired resolution may be utilized without departing from the scope of this invention. Also, a pulse generator with integral counting capability may be utilized to achieve the same purpose as the combination of the counter 42, tap delay 44, and pulse generator 40 of FIG. 1.

In sum, at the start of the interrogation pulse 39, the output pulse generator 40 produces a first pulse (start pulse) 46. Then, the microprocessor 34 calculates a predicted position from the history table 35, compensates the predicted position using the data in table 36, and provides the compensated position to the output pulse generator 40. (Alternatively, the microprocessor could receive the calculated positions from the circuit 37 and compensate them prior to storing them in history table 35. Then, the microprocessor could calculate a predicted position from the pre-compensated positions in table 35, and feed this compensated predicted position to the pulse generator 40.) This compensated position is then converted to a time-related value t. The amount of time t can be calculated by dividing the compensated position by a standard gradient (e.g. 2830 m/s), which is to be programmed in all control systems 54 which use the transducer 10, and which was used to calibrate the compensation table 36. The counter 42 and tap delay 44 then count off the amount of time t corresponding to the compensated position. Upon completion of the counting by the tap delay 44, the output pulse generator 40 produces a second pulse 45, such as by rising or falling edge triggering, or other pulse generating techniques. Accordingly, the amount of time t between the pulses 45 and 46 is based on the time counted by the counter 42 and tap delay 44, and the time counted by the counter and tap delay is proportional to the compensated position value from the processor 34. Consequently, the amount of time t between the pulses 45 and 46 is directly proportional to the magnitude of the compensated position value, which is calculated by the processor 34 using a predetermined correction factor from those stored in the memory 36, as further detailed below. The compensation tables in memory 36 allow the predicted positions to be compensated to account for the amount that the propagation speed of the waveguide 16 varies from the standard value (e.g., 2830 m/s) and for non-linearities.

The output pulses 45 and 46 are provided to the control system 54 via line 47. The control system 54 then measures the time t between the pulses 45 and 46, and calculates a position based on the time t, such as by using the equation described above. The propagation speed used in the control system 54 to make the calculation can be permanently set to whatever predetermined standard value is used when establishing the data of the LUT 36, and when determining the time t. Thus, when switching transducers 10, the user need not re-program the control system 54, but, rather, can just replace the transducer 10 with another transducer which also has a pre-compensated or "standardized" pulsed output for that standard propagation speed (e.g., 2830 m/s).

Figure 3A:
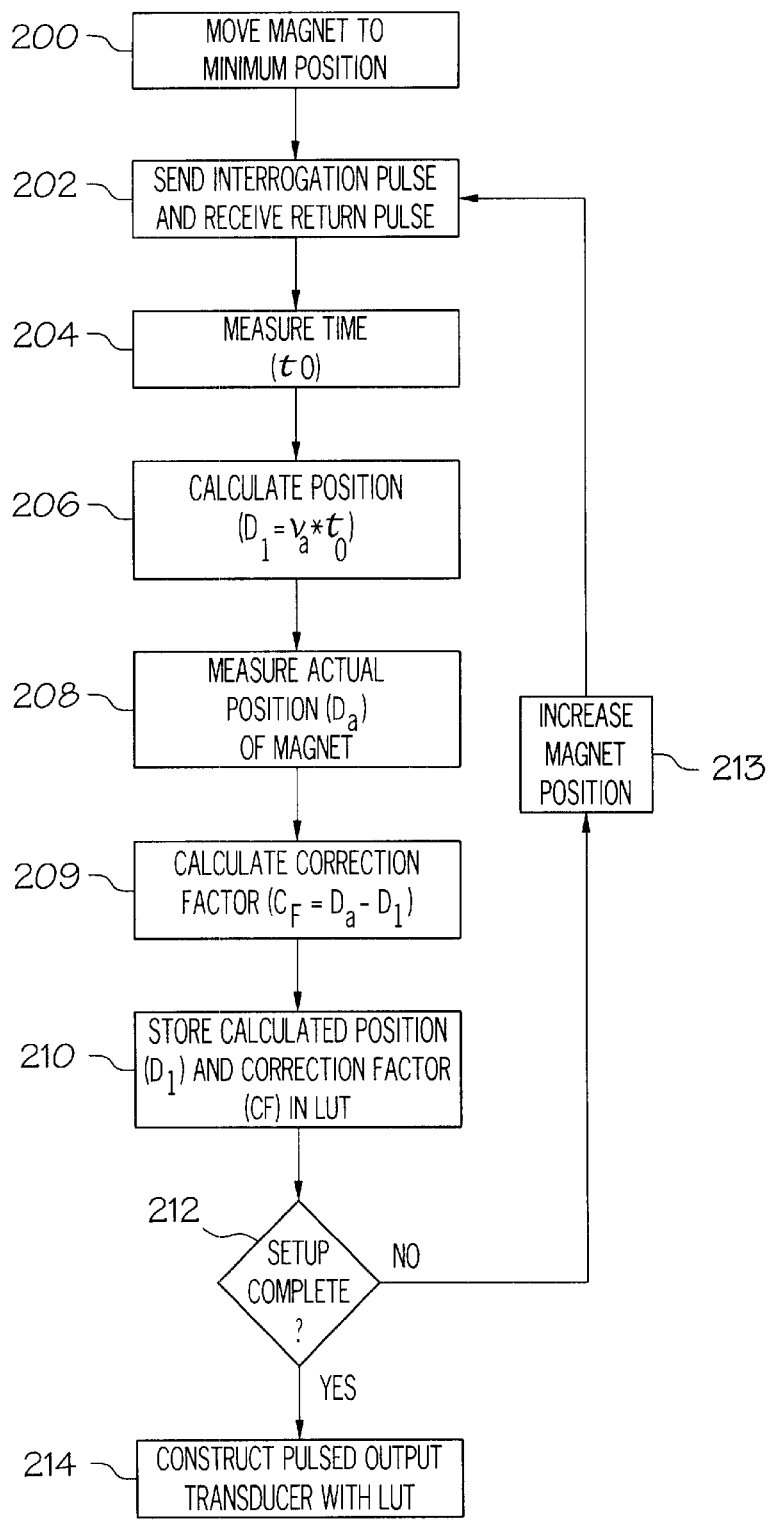
FIG. 3a is a flow diagram illustrating an exemplary method for calibrating data used in a pulsed output transducer, in accordance with principles of the present invention.

The flow chart of FIG. 3a depicts one potential procedure for establishing the LUT within the memory 36 of the transducer 10 of FIG. 1, or to otherwise calibrate correction data for a pulsed output transducer, according to one aspect of the present invention. Once the transducer has been assembled, the transducer magnet can be placed at the start (minimum) position of the stroke along the transducer housing. This is shown at step 200 of FIG. 3a. Then, a pulse generator creates an interrogation pulse which is fed through a conductor in the waveguide, or through the waveguide itself. This is shown at step 202.

Next, a timer circuit receives a response pulse from the coil and measures the time $t_0$ between the generation of the interrogation pulse and the receipt of the response pulse. This is shown as block 204. Then, at step 206, the time $t_0$ is used to calculate magnet position $D_1$, using the actual waveguide propagation velocity $v_a$, such as by using the equation relating distance, velocity, and time described above. As noted above, this calculated position will typically vary somewhat from the actual position of the magnet, due to component variances and tolerances, such as non-linearities or other peculiarities of the waveguide. Also, this calculated position will vary from what would have been calculated had a "standardized" propagation speed been used. According, the actual position ($D_a$) of the magnet is measured, at step 208, using a suitably precise measurement or calibration device, such as a laser interferometer for example.

The difference between the calculated position ($D_1$), from block 206, and the actual position ($D_a$), from block 208, is the correction factor (CF) which should be used ($CF=D_1-D_a$). This calculation of the correction factor (CF) is shown at block 209 of FIG. 3a. The correction factor (CF) should then be stored, along with the corresponding calculated position ($D_1$), such as in a non-volatile memory unit, and in a way which indicates that the two values are related or correspond. This is shown at block 210 of FIG. 3a.

Next, at step 212, it is decided whether the calibration is complete (i.e., whether the magnet has reached the end of the stroke). Typically, a large number of data points over a wide variety of magnet positions across the entire stroke of the magnet is desirable, as higher accuracy is thereby provided. If data has not been stored for the entire movement range of the magnet (i.e., the magnet is not at the end or maximum position), then step 213 is executed and the magnet is moved by a predetermined increment. Preferably, increments of about 0.1 mm are used, although other increments could be utilized depending on the accuracy desired, such as an increment in the range of 0.2 mm to 0.5 mm, for example. Then, the steps 202 to 212 are repeated for the new magnet position.

However, if sufficient data has been stored, then the construction of the transducer is completed, and the stored calibration data is included in the transducer. This step is shown as block 214 of FIG. 3a.

As an alternative to the incremental movement method described in FIG. 3a, the calibration could be conducted with a continuous movement of the magnet along the length of the waveguide. In this method, periodic position calculations are taken while the magnet moves. Each periodic position calculation is coordinated with a simultaneous actual position measurement. Accordingly, a plurality of calculated positions and their associated actual positions can be developed by taking periodic measurements or "snap shots" as the magnet moves. Correction factors can then be developed from this data. As another possible variation, the actual position of the magnet need not be measured during this continuous movement, if the magnet is moved according to a predetermined speed profile, such that the actual position of the magnet can be determined from the profile at any given time during the movement.

Figure 3B:
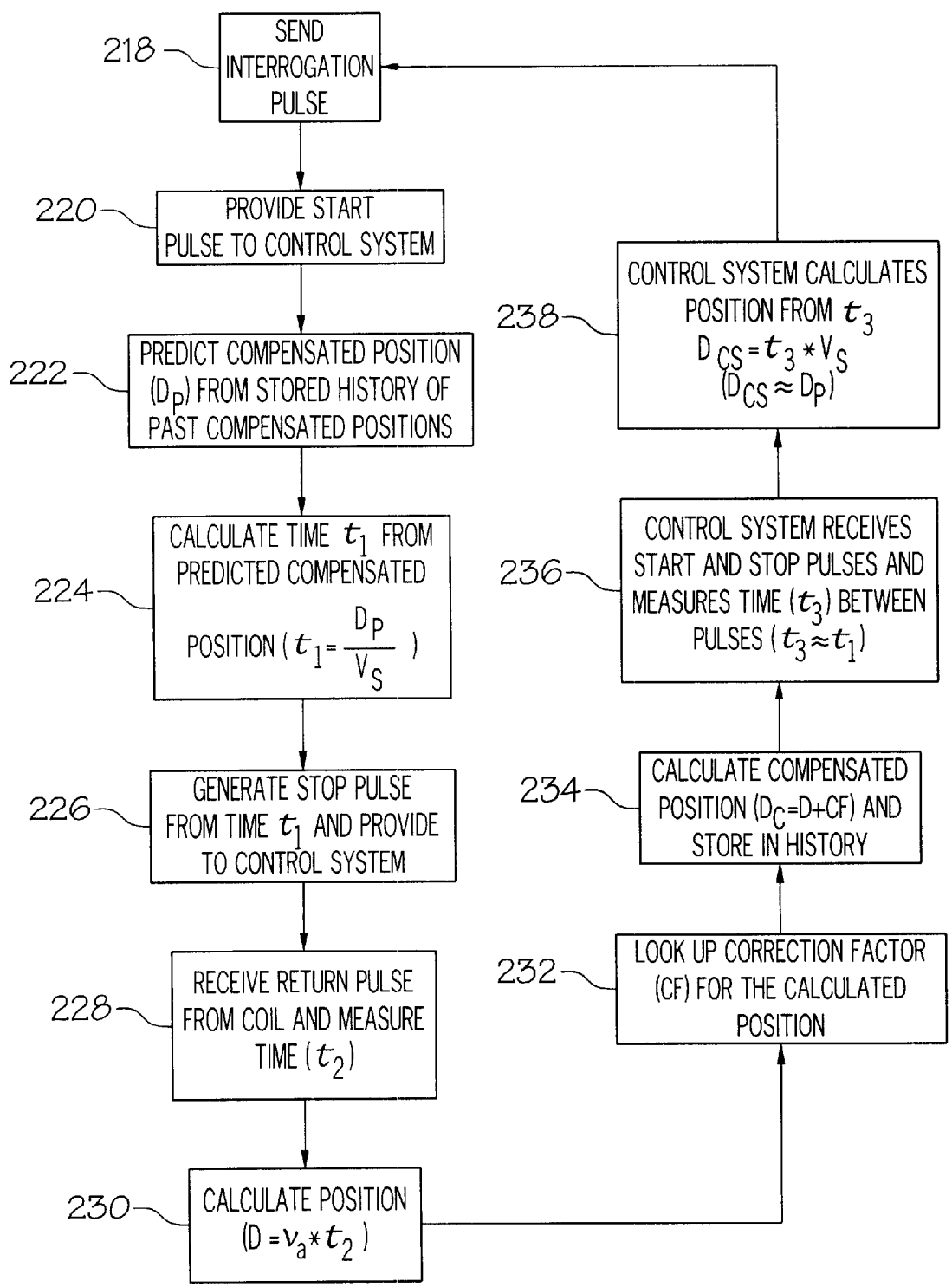
FIG. 3b is a flow diagram illustrating an exemplary method of operation of a pulsed output transducer, according to principles of the present invention.

Once calibration is complete, operation of the transducer using the generated correction data can then commence. FIG. 3b is a flow chart illustrating the operation of a pulsed output transducer having such correction factors for linearization and/or standardization. At step 218, an interrogation pulse is sent by a pulse generator, such as from a control system or from the transducer itself. In response to this interrogation pulse, a start pulse is output from the transducer on an output pin or line, at step 220. This could be achieved by providing a pulse generator circuit which is triggered from the interrogation pulse, or by passing the interrogation pulse as an output of the transducer.

Then, at step 222, a position ($D_p$) is predicted using a stored history of previous position calculations for previous interrogation pulses. This can be accomplished by using an extrapolation or curve-fitting technique, as described above. These stored positions calculations are preferably pre-compensated using their appropriate correction factor. Accordingly, no further compensation need be conducted on the predicted position $D_p$.

Once the pre-compensated, predicted position $D_p$ of the magnet is calculated, the value is converted back to a time value, using the equation $t_1 = D_p/v_s$, where the velocity $v_s$ is set to a predetermined "standard" value, which will also be used in the control system to which the transducer connects. This is a "standardization" step for the pulsed output of the transducer, such that the transducer output corresponds with a predetermined "standard" propagation speed, to be used for all transducers so programmed, as well as all control systems with which these transducers will be used. This is shown at step 224 of FIG. 3b.

Once the time $t_1$ has been calculated, it can be used to determine the generation of a stop pulse output, on the output line of the transducer. For example, a clock can start running once the "start" pulse has been provided (at step 220), and once the clock reaches the calculated time $t_1$, a "stop" pulse can be triggered. This is shown as step 226 in FIG. 3b.

At step 228, a response or return pulse is received from the mode convertor (e.g., coil), as a reaction to the interrogation pulse. The time $t_2$ between the interrogation pulse and the response pulse is then measured.

Then, at step 230, the position of the magnet can be calculated using the equation $D = v_a * t_2$, where $v_a$ is set equal to the actual propagation velocity of the waveguide (or to some other propagation velocity, so long as it matches that used during calibration, at step 206 of FIG. 3a). Once the position (D) of the magnet is calculated, a correction factor (CF) can be "looked up" or selected from a table or data storage device, at step 232. For example, the predicted position can be found in an array, list, or table of positions, stored during calibration, and the correction factor for that matching position can be selected. If no match can be found, then a correction factor can be interpolated from the correction factors for the preceding and subsequent positions in the list, such as by using a linear interpolation formula.

Then, at step 234, a "compensated" or standardized position value ($D_c$) can be calculated using the correction factor (CF) which has been selected from the table (or interpolated from data in the table). For example, the compensated position ($D_c$) can be calculated by adding the correction factor to the calculated position (D). This step "linearizes" the calculated position, such that non-linear variances are eliminated. The compensated position ($D_c$) is then stored in a past history memory, to allow for later position predictions during future executions of step 222.

The control system exterior to the transducer then receives the start and stop pulses which have been "artificially" generated by the transducer at steps 220 and 226, and measures the amount of time $t_3$ between the two pulses. This is shown at step 236 of FIG. 3b. This time $t_3$ should be approximately equal to the time $t_1$ discussed above. Using this time measurement $t_3$, the control system can calculate position ($D_{cs}$), using the formula $D_{cs} = v_s * t_3$. This step is shown at block 238. The control system calculation ($D_{cs}$) calculated in step 238 should be approximately equal to the predicted compensated position ($D_p$) calculated in step 222.

Thus, the control system need only be programmed once with a single standard propagation velocity $v_s$, because the transducer output pulses have been "standardized" to this velocity. The user need not spend the time to re-program this velocity when installing a new transducer, so long as the new transducer also includes an output standardized to this velocity according to the present invention. Subsequently, errors due to improper programming are eliminated, and programming knowledge is not required. Moreover, because the output has been linearized through the use of corrections factors, errors due to non-linearity are also eliminated.

One alternative to the steps shown in FIG. 3b would be to store the non-compensated positions (D) in the past history memory. In this case, the predicted position ($D_p$) would not be pre-compensated. Accordingly, the correction factor (CF) for each predicted position ($D_p$) would need to be looked up and added to the predicted position ($D_p$), to generate the compensated position ($D_c$). The time ($t_1$) would then be calculated from the post-compensated predicted position ($D_c$), and the stop pulse generated from the time $t_1$. Also, in this alternative, the non-compensated positions (D) would be stored directly in the history.

Also, as can be understood from the above description, steps 220 through 226 and 236 through 238 preferably operate simultaneously with steps 228 through 234. In other words, the sending of the interrogation pulse at step 218 initiates a first process which operates from steps 228 through 234. This process includes receiving the return pulse from the coil, calculating a position based upon the time between the interrogation pulse and the return pulse, looking up a correction factor, and calculating and storing a compensated position. The interrogation pulse from step 218 also initiates a second process which carries from steps 220 through 226, and continues to steps 236 through 238. The steps of this process include providing the start pulse, predicting a compensated position from the stored compensated positions, calculating a time from the predicted position, generating a stop pulse from the calculated time, receiving the start and stop pulses and measuring the time between them, and calculating a position from the measured time.

Figure 4A:
FIGS. 4a and 4b are exemplary data tables for use in calibrating a pulsed output transducer, in accordance with principles of the present invention.
Figure 4A:

The table of FIG. 4a provides an example of data that could be taken during steps 200–212 of FIG. 3a. For each calculated magnet position ($D_1$) in column 250 using the waveguide's velocity and assuming linearity, there is an actual magnet position ($D_a$) in column 252, which is manually measured, preferably as precisely as possible, such as by using a laser interferometer. The differences between the two columns in the table of FIG. 4a are due to the variances which are provided in the transducer. More specifically, in the context of magnetostrictive transducers, the differences can be due to non-linearity or other physical or material peculiarities.

Figure 4B:
Figure 4B:

The differences between the data in columns 250 and 252 of FIG. 4a can then be used to create correction factors, such as shown in FIG. 4b. Each calculated position in column 250 has a corresponding correction factor 254, which is calculated by determining the difference between the actual position of column 252 of FIG. 4*a* and the calculated position of column 250. This correction factor data can be stored in a paired fashion, or a similar relational manner, in nonvolatile memory, such as in an EEPROM. It can then be accessed as described above to provide linearity and standardization during use. It is preferred to store the correction factor in the memory, rather than the actual position value, because the correction factor should take up less memory. However, it is contemplated that storing the actual position value could be utilized as one potential alternative which can be used instead of or in addition to the correction factor storage technique.

Other embodiments can be constructed according to principles of the present invention. For example, calibration and operation can be conducted solely by using time values or time-related values, rather than making conversions to distance as in FIGS. 3*a* and 3*b*. Moreover, as an alternative to using "predicted" values as described above, actual measured values can be used to carry out the method. These alternatives are illustrated in the flow charts of FIGS. 5*a* and 5*b*. It is contemplated that the use of time values or distance values can be used with either the "prediction" method or the actual measurement method.

Figure 5A:
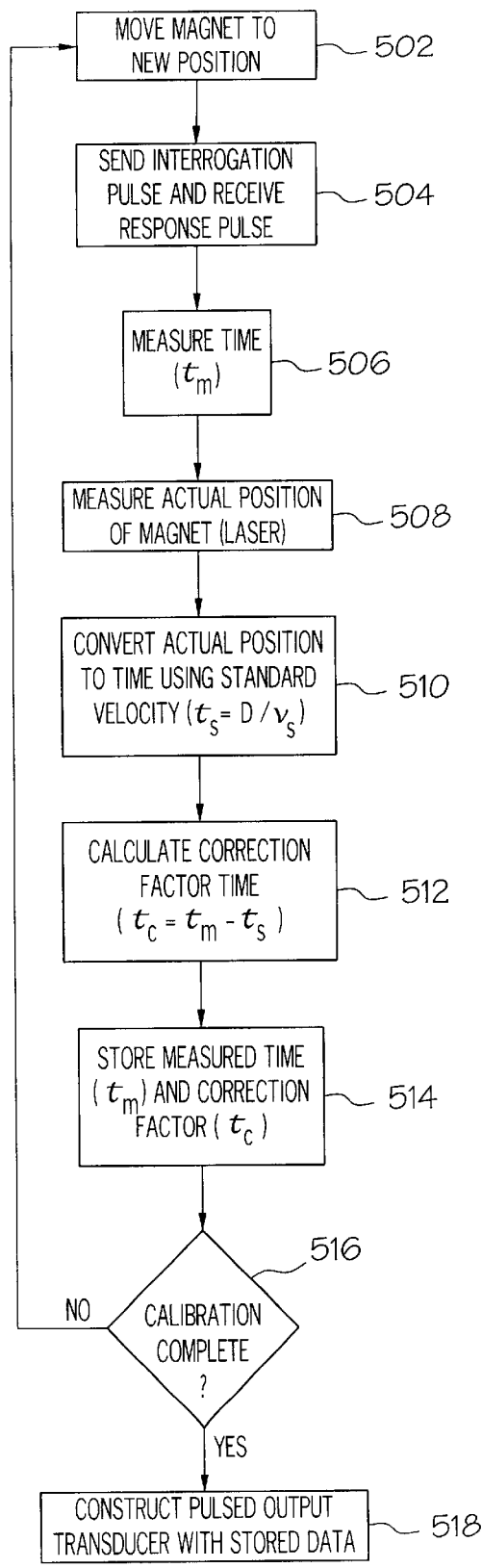
FIG. 5a is a flow diagram illustrating an alternative method for calibrating data used in a pulsed output transducer, according to principles of the present invention.

At step 502 of FIG. 5*a*, the transducer magnet is moved to a new position with respect to the waveguide. An interrogation pulse is then sent through the waveguide and a response pulse is received from a mode convertor, at step 504. Then, at step 506, the time $t_m$ between the interrogation pulse and the response pulse is measured. At step 508, an actual measurement of the magnet position D is taken, such as by using a laser interferometer.

Once the actual magnet position is known, a theoretical time value $t_s$ can be calculated by dividing the actual magnet position D by a standard velocity $v_s$. This step is shown as block 510 in FIG. 5*a*. The theoretical time value $t_s$ represents the difference in time between the interrogation pulse and return pulse which would have been measured, if the actual transducer waveguide had exactly the standard propagation velocity $v_s$ and acted in a truly linear manner. Of course, this is rarely, if ever, the case, and the theoretical time value $t_s$ will usually differ from the measured time value $t_m$ due to the component variances. Accordingly, at step 512, a correction factor time $t_c$ is calculated by subtracting the theoretical time $t_s$ from the measured time $t_m$. Then, at step 514, the measured time $t_m$ and the correction factor $t_c$ can be recorded, as a pair.

It is then determined, at step 516, whether it is desirable to measure and record additional correction factors for other magnet positions. As can be understood, better accuracy is obtained by recording correction factors for a large number of magnet positions across the entire range of movement of the magnet. However, an increase in the number of calibration measurements increases memory requirements. It has been found that taking measurements at about 1 mm increments across typical ranges of movement provides good results for many industrial waveguide applications.

If no more measurements are to be taken, then the method proceeds to step 518, and the pulsed output transducer is constructed with the recorded calibration data. If more measurements are to be taken, then the method returns to step 502, where the magnet is moved to a new position along the range of movement.

Once the transducer has been calibrated according to the method of FIG. 5*a*, it can be installed in the application, with its output line connected to the application's control system. Then, transducer operation can begin, such as described with respect to the flow diagram of FIG. 5*b*.

At step 520, an interrogation pulse is sent through the waveguide. A "start" pulse is then triggered by the sending of this interrogation pulse, and is provided as an output of the transducer. This step is shown at block 522, and can be accomplished by using a pulse generator circuit, for example.

Then, a mechanical wave is created in the waveguide which gives rise to a response pulse at a mode convertor. This step is shown at block 524. The amount of time $t_m$ which elapses between the interrogation pulse and the receipt of the response pulse is measured and is recorded, at step 526. Using this time measurement $t_m$, a correction time factor $t_c$ can be selected from the correction factors which were stored during calibration, such as by searching a lookup table or data array, for example. Interpolation from the stored data can be used if no match is found. This step is represented by block 528.

Once the correction factor $t_c$ is selected, it is added to the measured time $t_m$ at step 530, to produce a standardized and linearized time value $t_s$. This step is shown at block 530. Because the correction factor was calculated based upon a standard propagation velocity and using a linear equation, the correction factor will standardize the time value to the standard propagation velocity, and remove any non-linearity in the time value.

Then, the time value $t_s$ can be used to produce the output of the transducer. In particular, a counter can be started when the start pulse is provided (step 522), and, once the time $t_s$ is calculated, the counter is compared to the time $t_s$ to determine if this amount of time has elapsed since the production of the start pulse. The counter continues to run until it reaches the value of $t_s$. Then, a stop pulse is produced by the transducer on its output line, such as by using a pulse generator circuit, for example. These counting and pulse generating steps are shown at blocks 532 and 534 in FIG. 5*b*.

The control system with which the transducer is used should be designed to receive these start and stop pulses from the transducer and calculate a magnet position D, by measuring the time between the start and stop pulses. The time which is measured should be approximately equal to $t_s$ (although it may vary somewhat depending on the resolution of the counting components which are used). The position D can then be calculated by multiplying the measured time (which should be approximately $t_s$) by the standard velocity $v_s$. This step is shown at block 536. The standard velocity used in this step should be the same as the velocity used during step 510 of the calibration process in FIG. 5*a*, in order for the standardized transducer to properly match the control system. A number of transducers can be calibrated with this standard velocity, such that the user can replace the existing transducer with a new one when necessary, without having to re-program the control system. Also, transducers can be calibrated for a number of other standard propagation velocities, such that the user can have a number of standard velocities from which to choose.

Figure 5B:
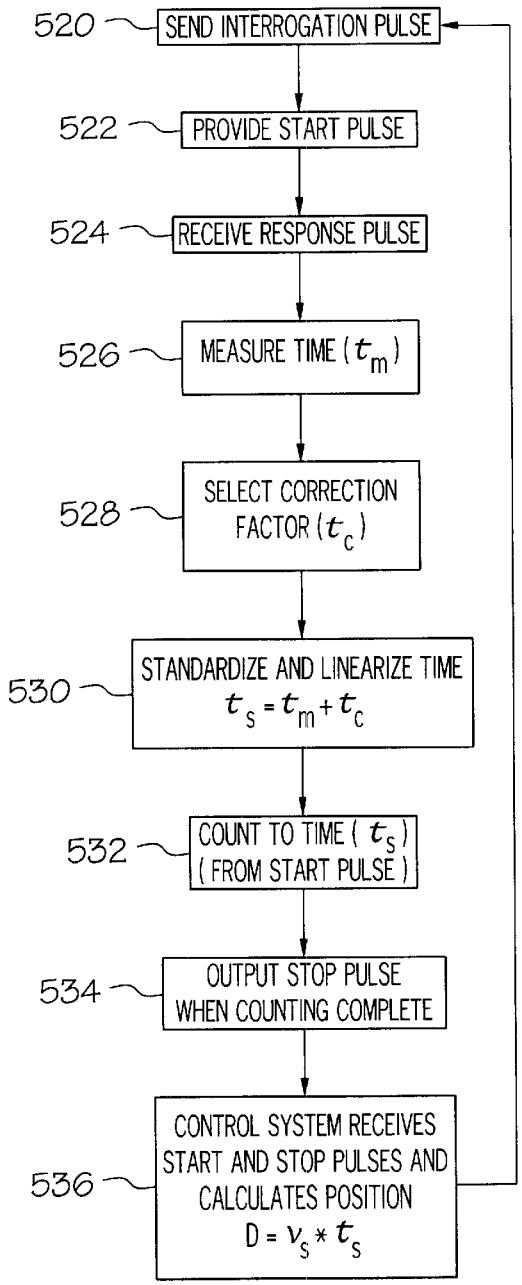
FIG. 5b is a flow diagram illustrating an alternative method of operation of a pulsed output transducer, in accordance with principles of the present invention.

For the methods of FIG. 5*a* and 5*b* to operate accurately, the actual propagation velocity of the transducer waveguide should be faster than the standardized velocity $v_s$ which is used. Otherwise, the measured time $t_m$ of step 526 will be greater than the standardized time $t_s$ of step 530, in which case the counter of step 532 will have already surpassed the standardized time value $t_s$ when the time $t_m$ is measured. Accordingly, an accurate stop pulse could not be provided (without some prior knowledge of the measured time $t_m$). To avoid this problem, the standard velocity $v_s$ used in FIGS. 5*a* and 5*b* can be set to a value which is lower than the propagation speed which is expected for any given waveguide. For example, the standard velocity could be set to a value of around 2800 m/s.

Also, it should be ensured that the time period between the interrogation pulses which are generated at step 520 is greater than the largest amount of time $t_s$ (between start and stop pulses) which is expected to be generated by the transducer. For example, for a magnet movement range (stroke) of 4 meters and a standard velocity of 2800 m/s, the largest time value $t_s$ will be 0.0014286 seconds. Thus, the period between interrogation pulses should be greater than this value. Accommodation should also be made for the processing time required to take the time measurement, make the correction using the correction factor, and provide the output pulses. For example, if the interrogation pulse period were exactly equal to the largest possible time value, then, when the maximum position is measured, no time would remain to make the correction and provide the output pulses.

Figure 6:
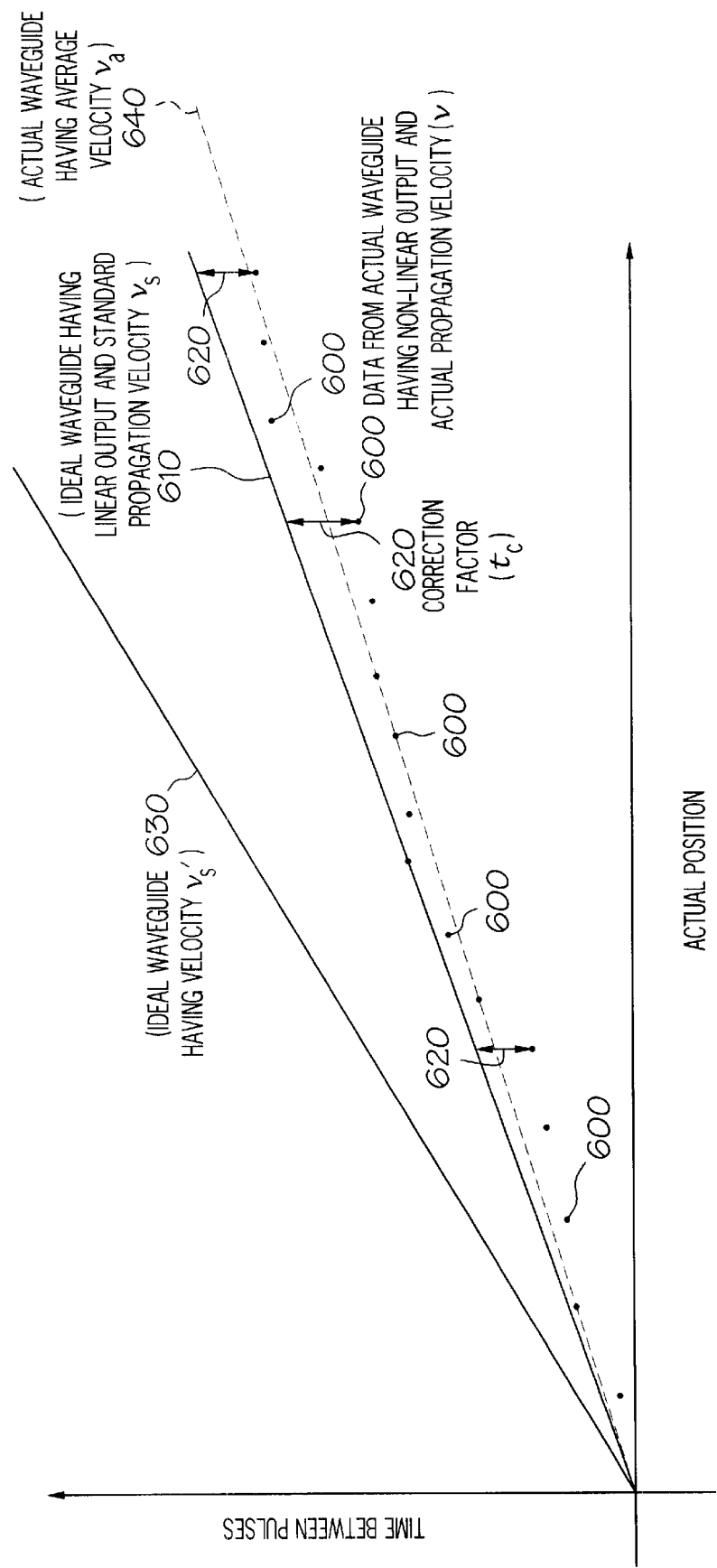
FIG. 6 is a graph illustrating how correction factors can be calculated from empirical data according to principles of the present invention, such that the waveguide of a transducer can simulate an ideal waveguide having a predetermined propagation speed.

FIG. 6 is a graph illustrating the effect of the linearization and standardization provided by use of the present invention in exemplary transducer arrangements. The line 610 represents the response of an ideal transducer having a completely linear waveguide and a standard propagation velocity of $v_s$. The time between the output pulses would be completely linearly related to the corresponding actual position of the magnet. The response of an ideal waveguide having a slower velocity $v_s'$ is shown as line 630.

However, an actual waveguide might produce data across the magnet stroke which corresponds to the datapoints 600. As can be seen from FIG. 6, this data does not follow a completely linear function. Also, the average propagation velocity $v_a$ for this waveguide (illustrated by line 640) is greater than that corresponding to the ideal functions 610 and 630. According to the present invention, such as described above with respect to various embodiments, these variances can be eliminated by determining a correction factor 620 for each data point 600. During use, the correction factors 620 can then be accessed to force the transducer output to simulate the response 610 of a totally linear waveguide having the standard propagation velocity $v_s$ (As can be understood, correction factors 620 could alternatively be calculated to simulate any other ideal responses for other faster or slower velocities, such as response 630. Thus, the standard or ideal velocity can be customized to be whatever the end user desires and does not have to be selected from a limited set of values, because the transducer can be customized to simulate any propagation velocity.) The control system can then be programmed once with this standard velocity $v_s$. When the transducer needs replacing, the user need only replace the original transducer with one that has been calibrated during manufacture to the same standard velocity $v_s$.

Figure 7:
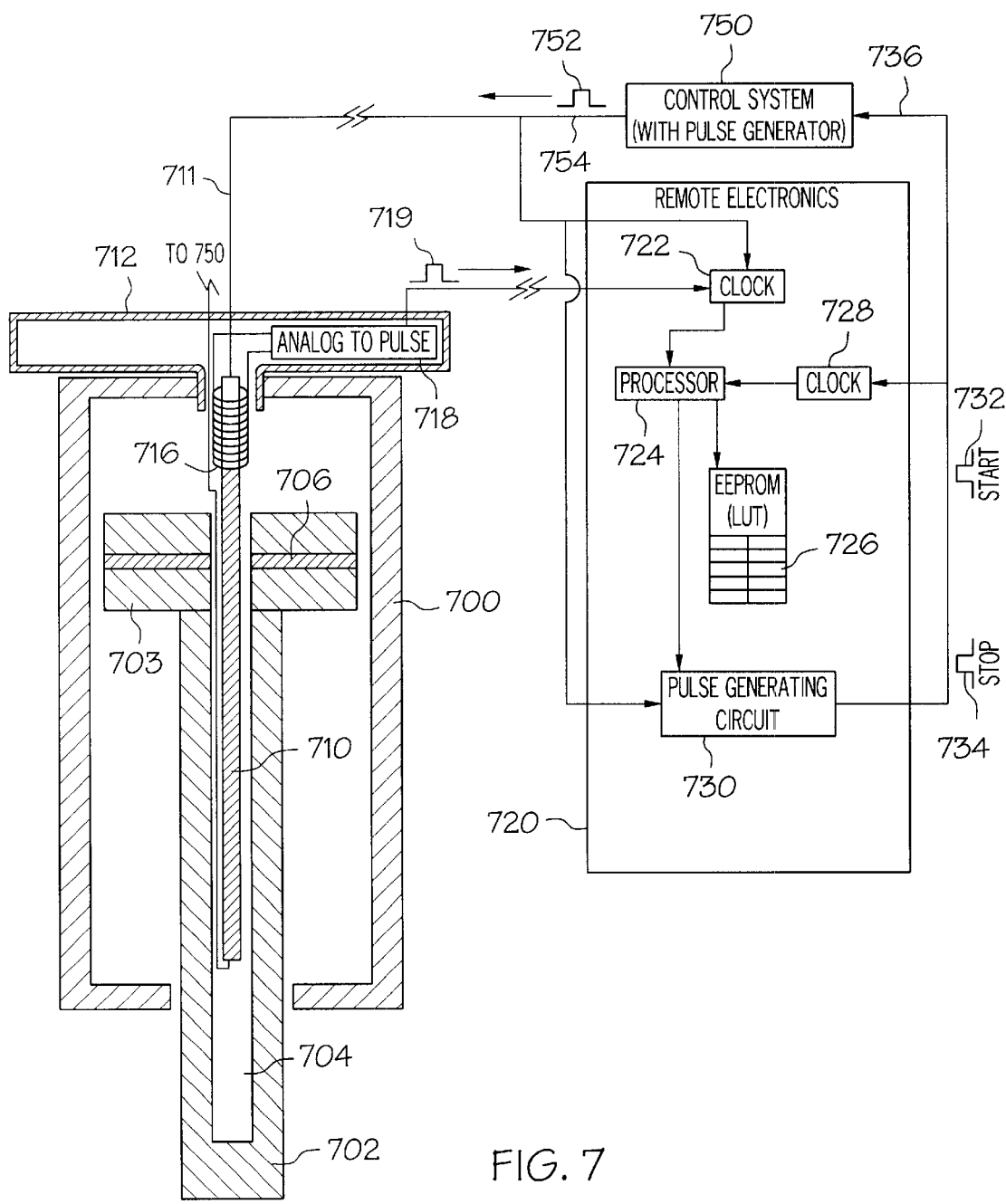
FIG. 7 is a partial cross-sectional diagram illustrating a side view of an exemplary internally compensated, pulsed-output magnetostrictive transducer, which is partially embedded in a cylinder and has remotely located electronics, according to principles of the present invention.

FIG. 7 is a block diagram illustrating another embodiment of the present invention. In this embodiment, the transducer is embedded within a cylinder 700 having a movable member, shown as a piston rod 702, connected to which is a piston head 703. A bore 704 is provided within the rod 702 and head 703 to accommodate the waveguide 710 of the transducer (and any necessary waveguide mounting component or housing, not shown). A magnetic material 706 is provided on or within the piston head 703, and the position of this material 706 is to be detected by the transducer, so as to indicate the position of the head 703. (In an alternative application where it is desirable to measure a fluid level rather than a piston position, a magnetic float can be provided within the cylinder 700, and the position of the fluid detected by detecting the position of the float).

At one end of the waveguide 710 is a coil 716, or other mode convertor. A signal conditioning electronics housing 712 is provided near this proximal end of the waveguide, on the exterior of the cylinder 700. The waveguide 710 and coil 716 can be secured to the housing 712 by a suitable connector or connectors, and the housing 712 can be secured to the cylinder 700, such as by threading and/or by a seal for example. Within the signal conditioning housing 712 is a signal conditioning circuit 718. Preferably, this circuit 718 comprises an analog-to-digital-pulse convertor circuit, although other signal conditioning circuitry could be provided, such as amplification circuitry or digital pulse generating circuitry.

Located remotely from the embedded transducer is a control system 750, which includes a pulse generator for providing an electrical interrogation pulse 752 through output line 754. This pulse 752 is then transmitted to a conductor 711 which conducts the pulse through the waveguide 710 (and back to the control system). The interrogation pulse 752 interacts with the magnetic material 706 of the piston head 703 to produce a mechanical wave in the waveguide. When the mechanical wave passes the coil 716, an electrical return pulse is generated at the coil terminals. The ADC 718 converts this electrical return pulse to a digital pulse 719, which is more immune to noise when traveling a long distance than is an analog pulse.

Remote electronics 720 are housed remotely from the signal conditioning electronics 718, and the digital pulse 719 is transmitted, such as through a conductor or by a wireless transmission for example, to the remote electronics. The remote electronics 720 complete the transducer processing and provide the transducer output. By locating these electronics 720 away from the rest of the transducer, a large housing is not needed near the cylinder 700. It is undesirable to have a large housing near the cylinder 700 because space is often tight near such cylinders, and because the risk of damage to the electronics (by humans and/or machines) is greater when the electronics are kept near the cylinder. Because only signal conditioning electronics 718 are kept in housing 712, this housing can be provided with a small size and low profile, so that it does not take up a great amount of space and is relatively unobtrusive. Also, because the electronics 720 are located remotely, a housing for these electronics is not required.

According to this embodiment, remote electronics 720 include a clock 722 which is in communication with (i.e., receives signals from and/or transmits signals to) the control system output line 754, the output of the ADC 718, and a processor 724. The processor 724 is also in communication with a second clock 728, an EEPROM memory 726 and a pulse generating circuit 730. Also in communication with the pulse generating circuit 730 are the control system output line 754, a control system input line 736, and the clock 728. As can be understood, the elements of the remote electronics 720 could be provided as separate digital and/or analog circuits or components, or could be provided as an integrated circuit, control chip, or ASIC.

In operation, the clock 722 begins timing upon receiving the interrogation pulse 752 from the control system 750, and stops timing when the digital pulse 719 is received from the ADC 718. Preferably, this time measurement is provided with high resolution, such as 61 picosecond resolution for example. Then, this measured time is provided by the clock 722 to the processor 724, which utilizes it to select a correction factor from a lookup table (LUT) stored in the EEPROM 726. The processor 724 then adds the correction factor to the measured time to produce a compensated time value.

The initiation of the interrogation pulse 752 also causes pulse generating circuit 730 to generate a "start" pulse 732, which is fed to the clock 728 and to the control system input 736. The clock 728 begins counting upon receiving the start pulse 732, preferably with high resolution, such as 61 picosecond resolution for example. Once the processor 724 has calculated a compensated time value using the correction factors in memory 726, it periodically compares the compensated time value to the running time provided by the clock 728. Once the compensated time value equals or exceeds the running time from the clock 728, the processor 724 sends a signal to the pulse generating circuit 730 to cause it to generate a "stop" pulse 734. The stop pulse 734 is then fed to the control system input line 736.

Accordingly, the remote electronics 720 have a pulsed interface with the control system 750, and the time between the start pulse 732 and the stop pulse 734 can be measured by the control system 750 and converted to a position. As described above, the correction factors in the memory 726 linearize the measured time, and also standardize it to a predetermined propagation speed. Thus, the control system 750 need only be programmed once with one propagation speed.

Also, by locating electronics 720 remotely from the rest of the transducer, space is saved and the electronics are protected from damage. Moreover, the analog-to-digital pulse circuit 718 allows the digital signal 719 to be transmitted further than if the signal had remained in analog format, because digital signals are more immune to noise than analog signals. Accordingly, the remote electronics 720 can be located further from the rest of the transducer, by converting the response pulse to a square pulse through use of the circuit 718.

Figure 8:
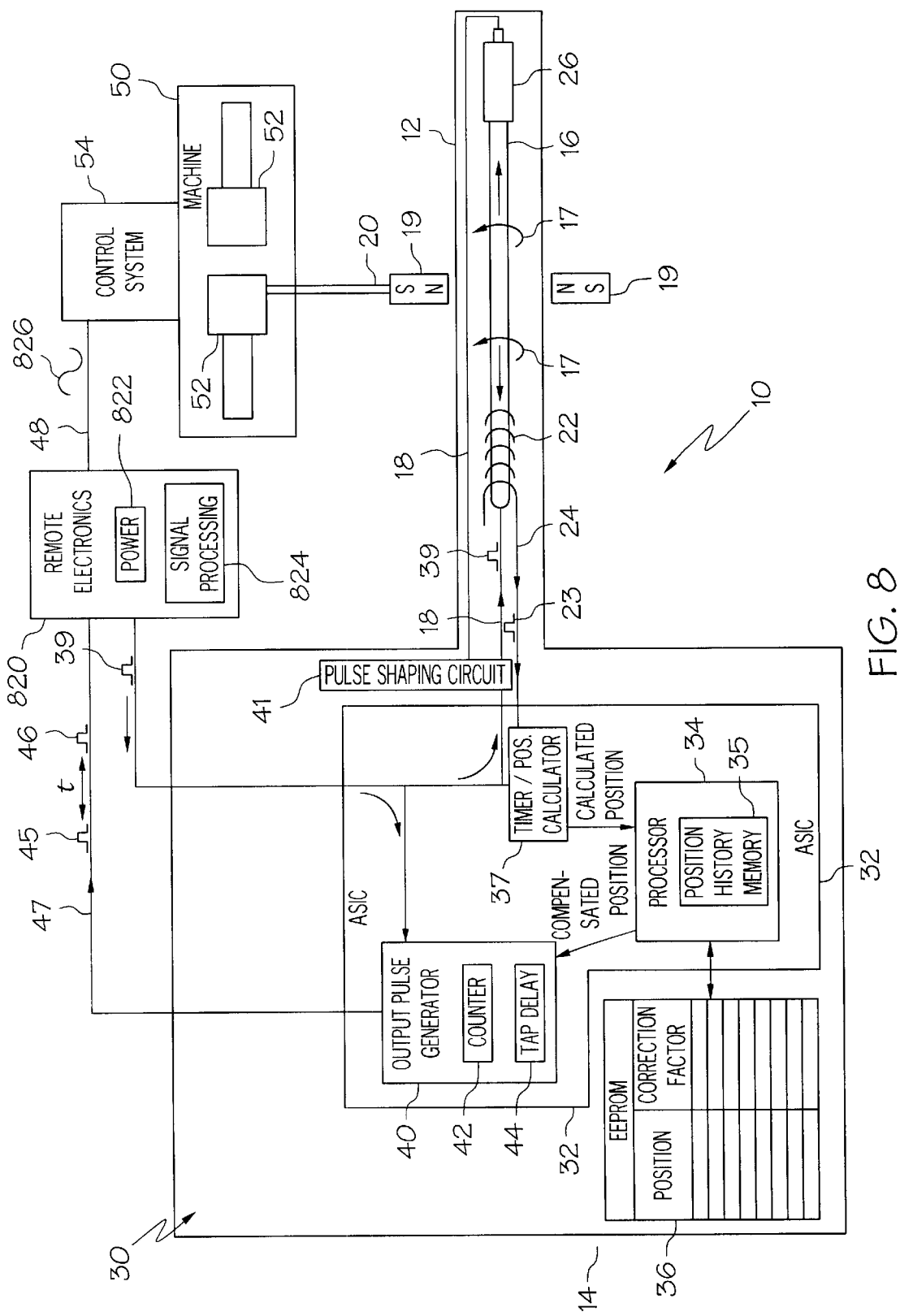
FIG. 8 is a diagram illustrating a side view of an exemplary internally compensated, pulsed-output magnetostrictive transducer having remote electronics containing signal processing circuitry, in accordance with principles of the present invention.

FIG. 8 illustrates another alternative embodiment of a magnetostrictive position sensor made in accordance with principles of the present invention. The embodiment of FIG. 8 operates in a similar manner to the embodiment of FIG. 1. However, in this embodiment, remote electronics 820 are provided between the proximal electronics 30 and the control system 54. The remote electronics 820 control the generation of the interrogation signal 39 to the waveguide 16. In addition, the remote electronics 820 receive the start output pulse 46 and the stop output pulse 45 from the proximal electronics 30 on line 47. After measuring the time t between the pulses 45 and 46, the remote electronics 820 can convert the measured time t to another signal, as desired.

For example, the remote electronics 820 can include a signal processing circuit 824 to measure the time t and to convert the time t to a corresponding distance value, using the equation described above and the standard propagation velocity used by the electronics 30. As described above with respect to FIGS. 1 and 3, the pulses 45 and 46 have been linearized to eliminate non linearities and standardized to a standard propagation velocity. Thus, the signal processing circuit 824 need only be programmed once with the standard propagation velocity. The distance value calculated by the signal processing circuit 824 can then be provided to the control system 54 from the remote electronics 820 in any desired format, such as an SSI (synchronous serial interface) format or an analog format, for example. In FIG. 8, the format provided is an analog voltage 826 which is directly proportional to the distance value calculated. The control system 54 can then receive the analog voltage signal 826 on line 48 and use the signal as feedback to control the machine 50, as known in the art. Preferably, remote electronics 820 also includes a power supply 822. By locating the power supply 822 remotely, the size of the proximal electronics housing 14 can be reduced, thereby allowing the transducer 10 to fit more easily in tight applications, such as hydraulic or pneumatic cylinder applications, for example.

Figure 9:
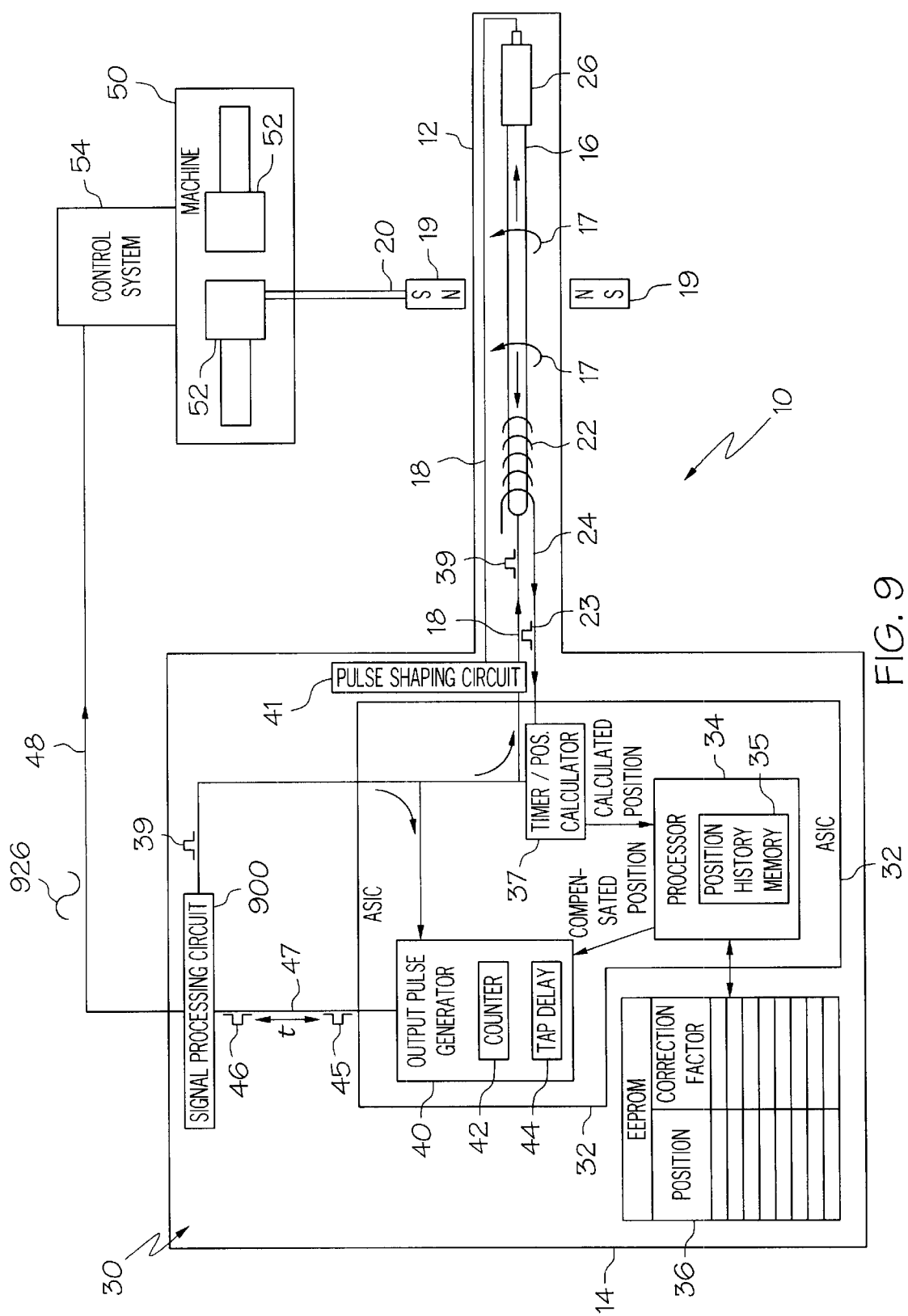
FIG. 9 is a diagram illustrating a side view of an exemplary magnetostrictive transducer which generates compensated start/stop pulses and then converts the pulses to another format by signal processing circuitry, according to principles of the present invention.

FIG. 9 illustrates another alternative embodiment of a magnetostrictive transducer having compensated start and stop pulses, according to the present invention. This embodiment also operates in a similar manner to the embodiment of FIG. 1. However, in this embodiment, the interrogation signal 39 is generated by a signal processing circuit 900. In addition, the compensated start and stop pulses 45 and 46 are processed by this signal processing circuit 900, which then provides the output 926 to the control system 54. Preferably, the signal processing circuit 900 of this embodiment is a part of electronics 30 and is contained within electronics housing 14. In this embodiment, the signal processing circuit 900 receives the compensated start and stop pulses 45 and 46 on line 47 and converts the pulses to another signal 926, such that the signal 926 represents the distance which was previously represented by the time t. (Again, the pulses 45 and 46 have been linearized to eliminate non linearities and standardized to a standard propagation velocity as described above with respect to FIGS. 1 and 3.) In other words, the signal processing circuit 900 can measure the time t between the pulses 45 and 46 and convert the time to a distance value using the propagation velocity to which the pulses 45 and 46 have been standardized. The distance value can then be represented by any desired signal 926, such as an analog or SSI signal for example. The signal 926 is then received by the control system 54 over line 48, and is used by the control system to control the machine 50.

The foregoing descriptions of the preferred embodiments of the invention have been presented for purposes of illustration and description only. They are not intended to be exhaustive or to limit the invention to the precise forms disclosed, and modifications and variations are possible and contemplated in light of the above teachings. While a number of preferred and alternate embodiments, methods, systems, configurations, and potential applications have been described, it should be understood that many variations and alternatives could be utilized without departing from the scope of the invention.

For example, it should be understood that the invention can be used in a variety of pulsed output sensors, and should not be limited to pulsed magnetostrictive linear position transducers. For such a pulsed output condition sensor, correction factors to provide linearity can be calculated by comparing the sensor output with another measurement. Then, these correction factors can be used to compensate the transducer measurement, and pulses can be generated using the compensated measurement. For example, the invention may be applicable to pulsed output temperature or pressure sensors. Moreover, if the correction factor is the same for all transducer measurements, a lookup table or similar structure would not be needed, and a single calculation can be made to compensate all transducer measurements.

Moreover, although a variety of potential circuit configurations and components have been described, it should be understood that a number of other configurations and components could be utilized without departing from the scope of the invention. As known in the art, separate components described herein can be combined in an integrated circuit, and integral components can be provided as separate circuits. Also, wired connections can be made wireless, and vice versa, as also known in the art.

Thus, it should be understood that the embodiments and examples have been chosen and described in order to best illustrate the principals of the invention and its practical applications to thereby enable one of ordinary skill in the art to best utilize the invention in various embodiments and with various modifications as are suited for particular uses contemplated. Accordingly, it is intended that the scope of the invention be defined by the claims appended hereto.

What is claimed is:

1. A method for providing a compensated linear position transducer output, comprising:

generating an interrogation signal to create a mechanical wave in a waveguide;

converting the mechanical wave to a response signal;

measuring the time between the interrogation signal and response signal;

calculating a position based upon the measured time;

adjusting the calculated position such that it matches an ideal transducer having a linear waveguide response and a predetermined standard waveguide propagation velocity; and generating a start pulse and a stop pulse, the time between the start and stop pulses being derived from the adjusted position.

2. The method as recited in claim 1, further comprising:

receiving the start and stop pulses in a machine control system;

measuring the time between the start and stop pulses; and converting the measured time to a position value using the predetermined standard waveguide propagation velocity, the position value having substantially the same value as the adjusted calculated position, wherein the position value is utilized by the machine control system to control a machine.

3. The method as recited in claim 1, wherein the start and stop pulse generating step comprises:

generating the start pulse in response to the generation of the interrogation signal, starting a counter upon the generation of the start pulse; and when the counter reaches a value corresponding to the adjusted position, generating the stop pulse.

4. A method for providing a compensated linear position transducer output, comprising:

a) generating an interrogation pulse through a conductor to create a mechanical wave in a waveguide at the position of a magnet located in proximity to the waveguide;

b) generating a response pulse from the mechanical wave;

c) measuring the time between the interrogation pulse and the response pulse;

d) determining a digital value based upon the measured time;

e) measuring an actual magnet position along the waveguide using a measuring device;

f) calculating a correction factor using the actual magnet position and the digital value;

g) storing the correction factor in memory;

h) moving the magnet and repeating steps a through g;

i) calculating an adjusted digital value using one of the stored correction factors; and j) generating a start pulse and a stop pulse, the time between the start and stop pulses being proportional to the adjusted digital value.

5. The method as recited in claim 4, wherein the digital value and the correction factor comprise units of time.

6. The method as recited in claim 4, wherein the digital value and the correction factor comprise units of linear position.

7. The method as recited in claim 4, wherein the adjusted digital value calculation comprises the steps of:

measuring the time between an interrogation pulse and a response pulse;

determining a measurement value corresponding to the measured time;

selecting one of the stored correction factors using the measurement value; and adding the selected correction factor to the measurement value to produce the adjusted digital value.

8. The method as recited in claim 4, wherein the adjusted digital value calculation comprises the steps of:

measuring respective times between a plurality of interrogation pulses and response pulses;

determining position values for each measured time;

storing the position values;

calculating a predicted position value using the stored position values;

selecting one of the stored correction factors using the predicted position value; and adding the selected correction factor to the predicted position value to produce the adjusted digital value.

9. The method as recited in claim 4, wherein the adjusted digital value calculation comprises the steps of:

measuring respective times between a plurality of interrogation pulses and response pulses;

determining position values for each measured time;

selecting a stored correction factor for each position value;

adding the selected correction factor to each respective position value to produce corrected position values;

storing the corrected position values; and calculating a predicted position value using the stored corrected position values wherein the adjusted digital value is equal to the predicted position value.

10. A method of providing a compensated transducer output, comprising:

providing a digital value representing a detected condition;

adjusting the digital value to imitate the response of a predetermined ideal transducer;

generating a first transducer output pulse; and generating a second transducer output pulse after said first pulse, wherein the time delay between the first and second pulses is derived from the adjusted digital value.

11. The method as recited in claim 10, wherein the digital value and the adjusted digital value comprise units of time.

12. The method as recited in claim 10, wherein the adjusting step comprises:

applying a correction factor to the digital value.

13. The method as recited in claim 10, wherein the digital value comprises units of time, and the adjusting step comprises:

calculating a position value from the digital value and a predetermined standard waveguide propagation velocity, the adjusted digital value comprising the calculated position value.

14. The method as recited in claim 10, further comprising:

receiving the first and second transducer output pulses;

measuring the amount of time between the first and second transducer output pulses; and based upon the response of the predetermined ideal transducer, converting the amount of time to a value representing the detected condition.

15. A linear position transducer system, comprising
a waveguide;
an interrogation pulse generator circuit;
a mode convertor in communication with the waveguide;
a calculation circuit in communication with the mode convertor and the interrogation pulse generator circuit, wherein the calculation circuit is configured to measure the time between the generation of an interrogation signal from the interrogation pulse generator and the generation of a response signal from the mode convertor, and to generate a digital value based upon the time measurement;
a compensation circuit in communication with the calculation circuit and configured to adjust the digital value to create a compensated digital value which simulates the response of a waveguide having a predetermined standard propagation velocity; and
a stop pulse generator circuit in communication with the compensation circuit and configured to generate a stop pulse based upon the compensated digital value.

16. The system as recited in claim 15, further comprising:
a correction factor memory unit in communication with the compensation circuit, wherein the compensation circuit is configured to calculate the compensated digital value using a correction factor stored in the memory unit.

17. The system as recited in claim 15, wherein the stop output pulse generator circuit comprises:
a counter circuit; and
a tap delay circuit.

18. The system as recited in claim 15, further comprising:
a past history memory unit in communication with the calculation circuit and having a plurality of previous digital values stored therein corresponding to previous time measurements, wherein the calculation circuit is adapted to predict the digital value from the previous digital values.

19. The system as recited in claim 15, further comprising:
a start pulse generator circuit configured to generate a start pulse, the time between the start and stop pulses corresponding to the compensated digital value.

20. The system as recited in claim 19, further comprising
a control system in communication with the start pulse generator circuit and the stop pulse generator circuit, and configured to measure the time between the start and stop pulses, and to calculate a position value from the measured time and the predetermined standard waveguide propagation velocity.

21. The system as recited in claim 15, further comprising:
a past history memory unit in communication with the compensation circuit and having the compensated digital value stored therein, wherein the compensation circuit is adapted to calculate a predicted digital value from the compensated digital value;
a start pulse generator circuit configured to generate a start pulse, the time between the start and stop pulses being directly proportional to the predicted digital value.

22. The system as recited in claim 15, wherein the calculation circuit, the stop pulse generator circuit, and the compensation circuit are part of an integrated circuit.

23. The system as recited in claim 15, wherein the digital value and compensated digital value comprise units of time.

24. A linear position transducer system, comprising
a cylinder;
a waveguide provided at least partially within the cylinder;
an interrogation pulse generator circuit;
a mode convertor in communication with the waveguide;
a proximal electronics housing located adjacent the cylinder;
signal conditioning circuitry provided at least partially within the proximal electronics housing and in communication with the mode convertor, wherein the signal conditioning circuitry is configured to convert an analog response pulse from the mode convertor to a digital pulse signal; and
remote electronics located remotely from the cylinder, comprising:
a calculation circuit in communication with the signal conditioning circuitry, wherein the calculation circuit is configured to measure the time between the generation of an interrogation signal from the interrogation pulse generator and the generation of the digital pulse signal from the signal conditioning circuitry, and to generate a digital value based upon the measured time.

25. The system as recited in claim 24, wherein the remote electronics further comprises:
a compensation processor located remotely from the cylinder and in communication with the calculation circuit, wherein the compensation processor is configured to adjust the digital value to create a compensated digital value which simulates the response of a waveguide having a predetermined standard propagation velocity; and
a stop pulse generator located remotely from the cylinder and in communication with the compensation processor, wherein the stop pulse generator is configured to generate a stop pulse based upon the compensated digital value.

26. The system as recited in claim 25, wherein the remote electronics further comprises:
a memory unit located remotely from the cylinder and in communication with the compensation processor, wherein the memory unit has a plurality of correction factors stored therein, and wherein the compensation processor uses a correction factor to calculate the compensated digital value.

27. The system as recited in claim 24, further comprising:
a start pulse generator configured to generate a start pulse;
a stop pulse generator configured to generate a stop pulse, the time between the start and stop pulses representing the compensated digital value; and
a control system in communication with the start pulse generator and the stop pulse generator, and configured to measure the time between the start and stop pulses, and to calculate a position value from the measured time and the predetermined standard waveguide propagation velocity.

28. A method for providing a compensated linear position transducer output, comprising:
a) generating an interrogation pulse to create a mechanical wave in a waveguide at the position of a magnet located in proximity to the waveguide;

b) generating a response pulse from the mechanical wave;

c) measuring the time between the interrogation pulse and the response pulse;

d) determining a position value based upon the measured time;

e) measuring an actual magnet position along the waveguide using a measuring device;

f) calculating a correction factor using the actual magnet position and the position value;

g) storing the correction factor in memory;

h) moving the magnet and repeating steps a through g;

i) installing the memory in a transducer;

j) generating a second interrogation signal to create a second mechanical wave in the waveguide;

k) converting the second mechanical wave to a second response signal;

l) determining the time between the second interrogation signal and second response signal;

m) calculating a second position value based upon the determined time;

n) adjusting the second position value such that it matches an ideal transducer having a linear waveguide response and a predetermined standard waveguide propagation velocity;

o) storing the adjusted second position value;

p) calculating a predicted position value from the adjusted second position value; and q) generating a start pulse and a stop pulse, the time between the start and stop pulses being proportional to the predicted position value.

29. The method as recited in claim 28, further comprising:

measuring elapsed time between the start pulse and the stop pulse; and calculating a detected position value based upon the elapsed time, the detected position value having substantially the same value as the predicted position value.

30. A method for providing a compensated linear position transducer output, comprising:

generating an interrogation signal to create a mechanical wave in a waveguide;

converting the mechanical wave to a response signal;

measuring the time between the interrogation signal and response signal;

calculating a position based upon the measured time;

adjusting the calculated position such that it matches an ideal transducer having a linear waveguide response and a predetermined waveguide propagation velocity;

generating a start pulse and a stop pulse, the time between the start and stop pulses being derived from the adjusted calculated position;

converting the start and stop pulses to a position output signal, the position output signal having substantially the same value as the adjusted calculated position; and controlling a machine using the position output signal.

31. The method as recited in claim 30, wherein the start pulse and the stop pulse are generated by electronics which are proximal to the waveguide, and the pulses are converted to the position output signal by electronics which are remote from the waveguide.

* * * * *